(12) United States Patent
Nakanishi et al.

(10) Patent No.: US 9,983,441 B2
(45) Date of Patent: May 29, 2018

(54) LIQUID CRYSTAL DISPLAY DEVICE

(71) Applicant: Sharp Kabushiki Kaisha, Osaka (JP)

(72) Inventors: Youhei Nakanishi, Osaka (JP);
Masanobu Mizusaki, Osaka (JP);
Takeshi Noma, Osaka (JP)

(73) Assignee: MERCK PATENT GMBH, Darmstadt (DE)

( * ) Notice: Subject to any disclaimer, the term of this patent is extended or adjusted under 35 U.S.C. 154(b) by 0 days. days.

(21) Appl. No.: 14/433,925

(22) PCT Filed: Oct. 17, 2013

(86) PCT No.: PCT/JP2013/078235
§ 371 (c)(1),
(2) Date: Apr. 7, 2015

(87) PCT Pub. No.: WO2014/061754
PCT Pub. Date: Apr. 24, 2014

(65) Prior Publication Data
US 2015/0261044 A1   Sep. 17, 2015

(30) Foreign Application Priority Data

Oct. 19, 2012   (JP) .................................. 2012-232325

(51) Int. Cl.
*C09K 19/56* (2006.01)
*G02F 1/1337* (2006.01)
(Continued)

(52) U.S. Cl.
CPC ........ *G02F 1/133711* (2013.01); *C09K 19/56* (2013.01); *G02F 1/13439* (2013.01);
(Continued)

(58) Field of Classification Search
CPC ..................................................... C09K 19/56
See application file for complete search history.

(56) References Cited

U.S. PATENT DOCUMENTS

2005/0116200 A1    6/2005  Nakanishi et al.
2011/0102720 A1*   5/2011  Mizusaki ................ C08F 20/00
                                                         349/123
(Continued)

FOREIGN PATENT DOCUMENTS

JP   2003-307720 A    10/2003
WO   2009/157207 A1   12/2009
(Continued)

*Primary Examiner* — Chanceity Robinson
(74) *Attorney, Agent, or Firm* — Chen Yoshimura LLP

(57) ABSTRACT

A liquid crystal display device includes: a polymer layer that controls the alignment of liquid crystal molecules on at least one of the first substrate and the second substrate. The polymer layer is formed by polymerizing one or more radical-polymerizable monomers added to the liquid crystal layer. At least one of the radical-polymerizable monomers is a compound represented by $P\text{-}Sp^1\text{-}Z^2\text{-}A^1\text{-}(Z^1\text{-}A^2)_{n1}\text{-}Z^3\text{-}Sp^2\text{-}P$. In an example encompassed by the formula, P represents a radical-polymerizable group. $Sp^1$ and $Sp^2$ each represent a direct bond or an alkylene group. $A^1$ represents a divalent aromatic hydrocarbon group. $A^2$ represents a phenylene group. $Z^1$, $Z^2$, and $Z^3$ may be the same or different. At least one of $Z^1$, $Z^2$, and $Z^3$ represents a direct bond, or an —NRCO— group or —CONR— group. R represents a hydrogen atom or a $C_1$-$C_6$ linear alkyl group or alkenyl group. $n^1$ is 0 or 1.

18 Claims, 16 Drawing Sheets

(51) Int. Cl.
*G02F 1/1333* (2006.01)
*C09K 3/10* (2006.01)
*G02F 1/1343* (2006.01)
*G02F 1/139* (2006.01)
*C09K 19/54* (2006.01)

(52) U.S. Cl.
CPC .. *G02F 1/133345* (2013.01); *G02F 1/134309* (2013.01); *C09K 3/10* (2013.01); *C09K 2019/548* (2013.01); *G02F 1/1393* (2013.01); *G02F 1/133707* (2013.01); *G02F 1/133788* (2013.01); *G02F 1/134363* (2013.01); *G02F 2202/023* (2013.01)

(56) References Cited

U.S. PATENT DOCUMENTS

| | | | | |
|---|---|---|---|---|
| 2011/0267574 | A1* | 11/2011 | Kawahira | G02F 1/133788 349/158 |
| 2013/0169916 | A1* | 7/2013 | Mizusaki | C09K 19/14 349/123 |
| 2014/0168586 | A1 | 6/2014 | Mizusaki et al. | |
| 2015/0234236 | A1* | 8/2015 | Ohnishi | G02F 1/133723 349/123 |

FOREIGN PATENT DOCUMENTS

| | | |
|---|---|---|
| WO | 2010/079703 A1 | 7/2010 |
| WO | 2012/032857 A1 | 3/2012 |
| WO | 2012/121319 A1 | 9/2012 |
| WO | WO 2012121319 A1 * | 9/2012 ......... C09K 19/2014 |

* cited by examiner (a)

Ester group (b)

Amide group

LIQUID CRYSTAL DISPLAY DEVICE

TECHNICAL FIELD

The present invention relates to a liquid crystal display device. More particularly, the present invention relates to a liquid crystal display device provided with a polymer layer (a "polymer sustained alignment" (PSA) layer) that controls the alignment of liquid crystal molecules and is formed by polymerizing a monomer contained in a liquid crystal composition.

BACKGROUND ART

Liquid crystal display (LCD) devices control whether light is transmitted or blocked (whether the display is on or off) by controlling the alignment of birefringent liquid crystal molecules.

Various liquid crystal alignment modes are utilized in LCD devices. Examples include: the twisted nematic (TN) mode in which liquid crystal molecules that exhibit positive dielectric anisotropy are aligned such that they twist 90° when viewed from the normal direction with respect to the substrates; the vertical alignment (VA) mode in which liquid crystal molecules that exhibit negative dielectric anisotropy are aligned perpendicularly to the substrate surfaces; the in-plane switching (IPS) mode in which liquid crystal molecules that exhibit positive dielectric anisotropy are aligned horizontally with respect to the substrate surfaces and a horizontal electric field is applied to the liquid crystal layer; and the fringe field switching (FFS) mode.

Liquid crystal display devices typically include an array substrate, a color filter substrate, and a liquid crystal layer sandwiched between this pair of substrates (the array substrate and the color filter substrate), for example. An alignment film may be applied to the surfaces of both substrates that are in contact with the liquid crystal layer.

An example of a method for manufacturing a liquid crystal display device will be described below. First, a plurality of spacers made of an insulating material are formed on one of the abovementioned substrates, and the substrates are fixed to one another. When a dripping method is used, a liquid crystal material is dripped in between the substrates before they are fixed together. When a vacuum injection method is used, the liquid crystal material is vacuum-injected between the substrates after they are fixed together, and then the injection hole is sealed. Next, polarizing plates, phase difference films, or the like are applied to the surface of each substrate opposite to the surface that is in contact with the liquid crystal layer, thereby completing the liquid crystal display panel. Finally, components such as a gate driver, a source driver, and a display control circuit are connected to the liquid crystal display panel, and a backlight or the like is provided, thereby completing the liquid crystal display device.

In recent years, technologies in which polymer layers (PSA layers) that control the alignment of the liquid crystal molecules and are formed either on top of the alignment film or directly on the substrates (if the substrates do not have an alignment film) have attracted attention. The PSA layers are formed by inserting a liquid crystal composition containing a liquid crystal material and a polymerizable ingredient such as a monomer or oligomer in between the substrates and then applying heat or irradiating the assembly with light (such as UV light) to polymerize the polymerizable ingredient (the monomer, oligomer, or the like).

Patent Document 1 discloses sandwiching a liquid crystal material into which a photopolymerizable compound is mixed between substrates on which photoalignment films are formed, and then irradiating the assembly with light to polymerize the photopolymerizable compound, thereby forming polymer sustained alignment layers. In Patent Document 1, the photoalignment films are alignment films that contain a polymer having a main chain and a side chain that includes a photoreactive functional group. These alignment films can be formed in a plurality of regions such that when the films are irradiated with light from different directions, the resulting alignment-restraining forces applied to the alignment films occur in different directions as well. Irradiating the photoalignment films with light causes impurities to form. However, the polymer sustained alignment layers fix the impurities in place and prevent impurity ions from entering the liquid crystal layer, thereby maintaining the pretilt angle of the liquid crystal molecules, preventing a reduction in voltage holding ratio, and inhibiting occurrence of burn-in.

Patent Document 2 discloses injecting a liquid crystal composition containing a polymerizable monomer in between the substrates and then irradiating the assembly with UV light while applying a voltage to transparent and oppositely disposed electrodes provided on the substrates. This polymerizes the monomer, thereby reducing occurrence of burn-in in the liquid crystal display device as well as resulting in the monomer having one or more ring structures or fused ring structures and two functional groups that are directly bound to the ring structures or fused ring structures.

RELATED ART DOCUMENTS

Patent Documents

Patent Document 1: WO 2009/157207
Patent Document 2: Japanese Patent Application Laid-Open Publication No. 2003-307720

SUMMARY OF THE INVENTION

Problems to be Solved by the Invention

When liquid crystal display devices in which a PSA treatment has been performed are used in high temperature or high humidity environments, discolorations and display irregularities sometimes form around the outer edges of the display region. Such discolorations and display irregularities will be described with reference to FIG. 39. FIG. 39 is a front view of a liquid crystal display device that was used in a high temperature and high humidity environment and on which a halftone (32/255) is displayed. After the liquid crystal display device 1000 was used in a high temperature and high humidity environment, the discolored region 1002 formed around the outer edges of the display region 1001. The outer edges and center area of the display region 1001 now exhibit a different brightness, and the user may perceive this display irregularity. The display region 1001 is the region in which an image is displayed for the user to view and does not include the bezel region 1003. The bezel region 1003 contains the gate driver, source driver, display control circuit, and the like.

In recent years, liquid crystal display devices are constructed with increasingly large display regions and increasingly small bezel regions. As the bezel regions get thinner, the abovementioned discolorations and display irregularities become more apparent to the user and can significantly impair the display quality of the liquid crystal display device.

The present invention was made in view of such problems and aims to provide a liquid crystal display device with which a high display quality can be maintained even when the device is used in high temperature or high humidity environments.

Means for Solving the Problems

The inventors investigated possible causes of discolorations and display irregularities in liquid crystal display devices, focusing in particular on the process used to fix the substrates to one another using a sealing material when manufacturing the liquid crystal display device. As the inventors continued their research, they found that if the sealing material used to fix the substrates to one another comes into contact with the liquid crystal layer before the sealing material has fully cured, ingredients in the sealing material can leach into the liquid crystal layer. The inventors also found that when a liquid crystal display device is used in a high temperature or high humidity environment, water moisture due to humidity or the like in the surrounding environment can get into the liquid crystal display device, resulting in that water moisture and ingredients in the sealing material leaching into the liquid crystal layer. Furthermore, the inventors found that the presence of this water moisture, impurities, or the like in the liquid crystal layer could result in discolorations and display irregularities.

As the inventors continued their research further, they found that inserting a liquid crystal composition containing a liquid crystal material and a radical-polymerizable monomer having an amide group between the substrates and then irradiating the assembly with UV light to polymerize the monomer and form a polymer layer (PSA layer) made it possible to control the alignment of the liquid crystal molecules as well as reduce the occurrence of discolorations and display irregularities even when the device was used in high temperature or high humidity environments.

The reason for this reduction in the occurrence of discolorations and display irregularities in the liquid crystal display devices will be explained with reference to FIG. 40. FIG. 40 illustrates the interaction of an ester group with a water molecule and the interaction of an amide group with a water molecule. In FIG. 40, $R^7$ to $R^{10}$ represent hydrocarbon groups bonded to the ester group and amide group.

Conventional monomers that are used to form a polymer layer (PSA layer) have an ester group (—COO— group). As shown in FIG. 40(a), a dipole-dipole interaction occurs between the —CO— group within the ester group and other polar molecules (such as water molecules and high polarity molecules in the ingredients in the sealing material) because this —CO— group has a relatively high polarity. However, it is difficult to sustain the interaction between conventional monomers and water moisture or impurities originating from the sealing material when the liquid crystal display device is used in a high temperature or high humidity environment, and therefore these impurities or the like remain present in the liquid crystal layer.

On the other hand, the amide group (—NRCO— group) in the radical-polymerizable monomer in the present invention has a —CO— group with an extremely high polarity compared to the —CO— group within an ester, and therefore an extremely strong dipole-dipole interaction occurs between the —CO— group within the amide group and other polar molecules. Furthermore, the amide group (—NHCO—) has a nitrogen atom and can form hydrogen bonds with hydrogen-bonding polar molecules such as water through the hydrogen atom bonded to the nitrogen atom. As a result, radical-polymerizable monomers that have an amide group exhibit a strong interaction with impurities that have a high polarity, particularly with hydrogen-bonding impurities. Therefore, the interaction of the monomer with water and high-polarity impurities can be maintained even in high temperature or high humidity environments, and the presence of impurities in the liquid crystal can be prevented.

The inventors predicted that this could effectively solve the abovementioned problems and arrived at the present invention.

One aspect of the present invention is a liquid crystal display device, including:

a first substrate and a second substrate;

a liquid crystal layer that contains a liquid crystal material and is sandwiched between the first substrate and the second substrate; and a polymer layer that controls an alignment of liquid crystal molecules and is formed on at least one of the first substrate and the second substrate, wherein the first substrate has a first electrode, wherein the polymer layer is formed by polymerizing one or more radical-polymerizable monomers that have been added to the liquid crystal layer, and wherein at least one of the radical-polymerizable monomers is a compound represented by chemical formula (1) below.

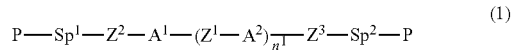
(1)

where:
P represents the same or a different radical-polymerizable group;
$Sp^1$ and $Sp^2$ may be the same or different and each represents a direct bond or a $C_1$-$C_6$ linear or branched alkylene group or alkyleneoxy group;
$A^1$ represents a divalent and alicyclic, aromatic monocyclic, or fused polycyclic hydrocarbon group;
$A^2$ represents a phenylene group or naphthalene group;
the —$CH_2$— groups in $A^1$ and $A^2$ may be replaced with —O— groups or —S— groups as long as those groups do not neighbor each other;
the —CH= groups in $A^1$ and $A^2$ may be replaced with —N= groups as long as those groups do not neighbor each other;
the hydrogen atoms in $A^1$ and $A^2$ may be replaced with fluorine atoms, chlorine atoms, a —CN group or $C_1$-$C_{12}$ linear or branched alkyl group, an alkoxy group, an alkylcarbonyl group, or an alkoxycarbonyl group or alkyl carbonyloxy group. Furthermore, the carbon atoms in these groups may be replaced with one or more silicon atoms;
$Z^1$, $Z^2$, and $Z^3$ may be the same or different and each represents a direct bond or an —O— group, —S— group, —NH— group, —CO— group, —COO— group, —OCO— group, —O—COO— group, —$OCH_2$— group, —$CH_2O$— group, —$SCH_2$— group, —$CH_2S$— group, —N($CH_3$)— group, —N($C_2H_5$)— group, —N($C_3H_7$)— group, —N($C_4H_9$)— group, —NRCO— group, —CONR— group, —$CF_2O$— group, —$OCF_2$— group, —$CF_2S$— group, —$SCF_2$— group, —N($CF_3$)— group, —$CH_2CH_2$— group, —$CF_2CH_2$— group, —$CH_2CF_2$— group, —$CF_2CF_2$— group, —CH=CH— group, —CF=CF— group, —C≡C— group, —CH=CH—COO— group, or —OCO—CH=CH— group;

at least one of $Z^1$, $Z^2$, and $Z^3$ represents an —NRCO— group or —CONR— group;

R represents a hydrogen atom or a $C_1$-$C_6$ linear alkyl group or alkenyl group; and $n^1$ is 0 or 1.

As long as the abovementioned required components are included, the present form of the liquid crystal display device is not particularly limited in regards to use of other components.

In consideration of the fact that monomers that have an amide group tend to have low solubility in liquid crystals, it is preferable that a modifying moiety such as a $C_1$-$C_6$ linear alkyl group or alkenyl group be added to the compound shown in chemical formula (1). This can improve the solubility of the monomer in liquid crystals.

Examples of compounds represented by chemical formula (1) include a compound represented by chemical formula (2) below.

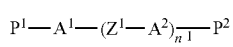
(2)

where:

$A^1$ represents a divalent and alicyclic, aromatic monocyclic, or fused polycyclic hydrocarbon group;

$A^2$ represents a phenylene group or naphthalene group;

the —CH$_2$— groups in $A^1$ and $A^2$ may be replaced with —O— groups or —S— groups as long as those groups do not neighbor each other;

the —CH= groups in $A^1$ and $A^2$ may be replaced with —N= groups as long as those groups do not neighbor each other;

the hydrogen atoms in $A^1$ and $A^2$ may be replaced with fluorine atoms, chlorine atoms, a —CN group or $C_1$-$C_{12}$ linear or branched alkyl group, an alkoxy group, an alkylcarbonyl group, or an alkoxycarbonyl group or alkyl carbonyloxy group. Furthermore, the carbon atoms in these groups may be replaced with one or more silicon atoms;

$Z^1$ represents a direct bond or an —O— group, —CO— group, —COO— group, —OCO— group, —NRCO— group, or —CONR— group;

R represents a hydrogen atom or a $C_1$-$C_6$ linear alkyl group or alkenyl group;

$P^1$ and $P^2$ may be the same or different and each represents a radical-polymerizable group. At least one of $P^1$ and $P^2$ is an acryloyl amino group or methacryloyl amino group; and $n^1$ is 0 or 1.

Examples of $A^1$ in compounds represented by chemical formulas (1) and (2) include a: benzene-1,2-diyl group; benzene-1,3-diyl group; benzene-1,4-diyl group; pyridine-2,3-diyl group; pyridine-2,4-triyl group; pyridine-2,5-diyl group; pyridine-2,6-diyl group; naphthalene-1,2-diyl group; naphthalene-1,4-diyl group; naphthalene-1,5-diyl group; naphthalene-1,8-diyl group; naphthalene-2,3-diyl group; naphthalene-2,6-diyl group; naphthalene-2,7-diyl group; cyclohexane-1,2-diyl group; cyclohexane-1,3-diyl group; cyclohexane-1,4-diyl group; decahydronaphthalene-1,2-diyl group; decahydronaphthalene-1,4-diyl group; decahydronaphthalene-1,5-diyl group; decahydronaphthalene-1,8-diyl group; decahydronaphthalene-2,3-diyl group; decahydronaphthalene-2,6-diyl group; indane-1,1-diyl group; indane-1,3-diyl group; indane-1,5-diyl group; indane-1,6-diyl group; phenanthrene-1,6-diyl group; phenanthrene-1,8-diyl group; phenanthrene-1,9-diyl group; phenanthrene-2,7-diyl group; phenanthrene-2,9-diyl group; phenanthrene-3,6-diyl group; phenanthrene-3,9-diyl group; phenanthrene-9,10-diyl group; anthracene-1,4-diyl group; anthracene-1,5-diyl group; anthracene-1,9-diyl group; anthracene-2,3-diyl group; anthracene-2,6-diyl group; anthracene-2,9-diyl group; or an anthracene-9,10-diyl group.

Examples of $A^2$ in compounds represented by chemical formulas (1) and (2) include a: benzene-1,2-diyl group; benzene-1,3-diyl group; benzene-1,4-diyl group; naphthalene-1,2-diyl group; naphthalene-1,4-diyl group; naphthalene-1,5-diyl group; naphthalene-1,8-diyl group; naphthalene-2,3-diyl group; naphthalene-2,6-diyl group; or a naphthalene-2,7-diyl group.

More specific examples of compounds represented by chemical formula (1) include a compound represented by any one of chemical formulas (3-1) to (3-18) below.

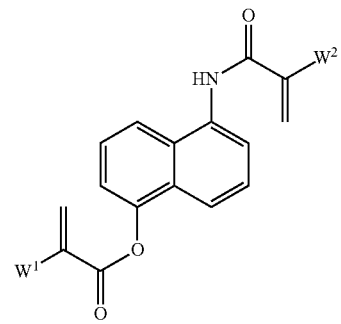
(3-1)

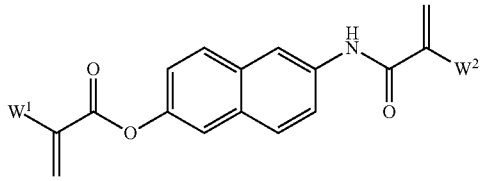
(3-2)

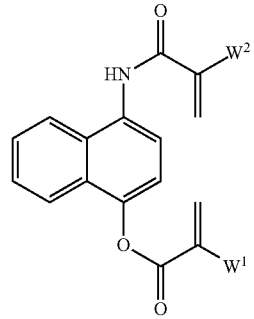
(3-3)

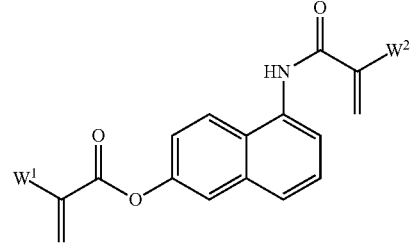
(3-4)

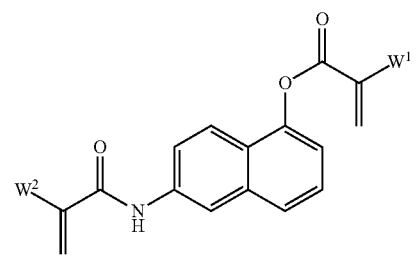 (3-5)

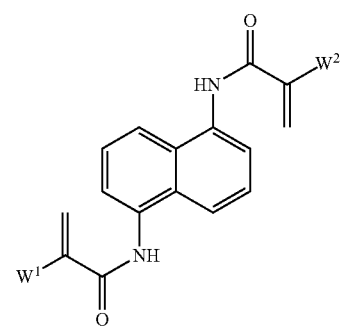 (3-6)

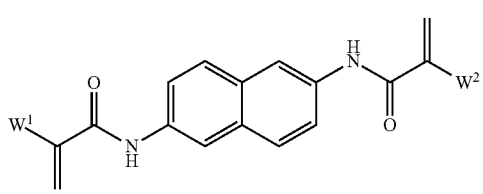 (3-7)

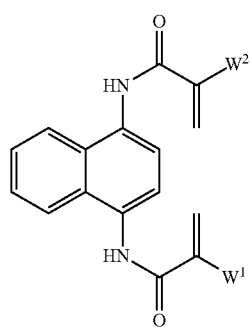 (3-8)

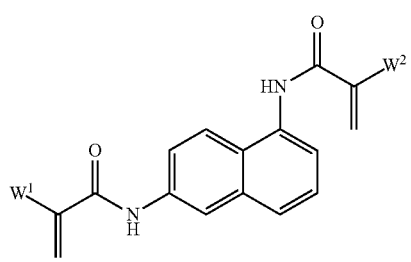 (3-9)

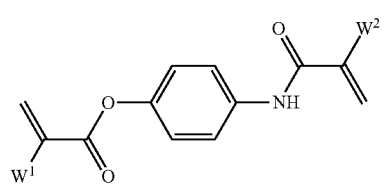 (3-10)

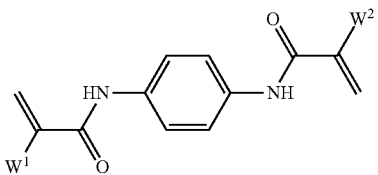 (3-11)

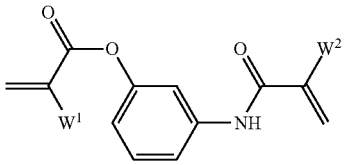 (3-12)

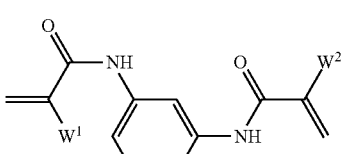 (3-13)

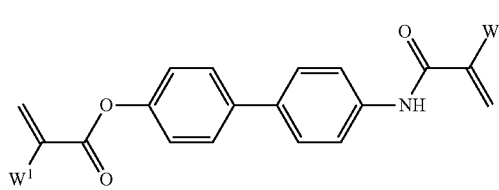 (3-14)

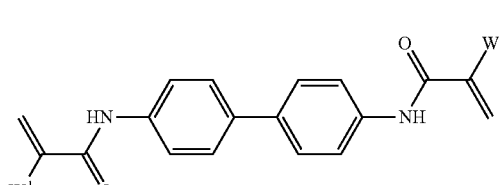 (3-15)

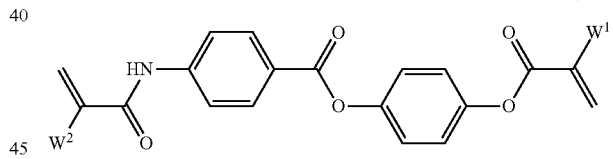 (3-16)

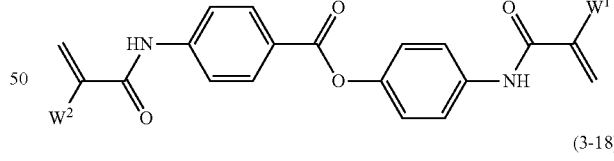 (3-17)

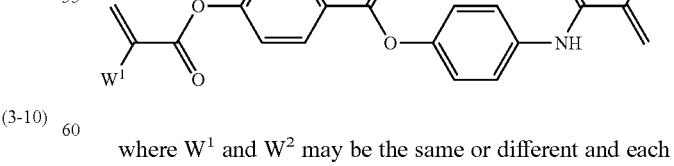 (3-18)

where $W^1$ and $W^2$ may be the same or different and each represents an —H group or a —$CH_3$ group.

The liquid crystal display device may further include at least another of the radical-polymerizable monomers, the at least another monomer having a structure that generates radicals due to a hydrogen abstraction reaction that occurs when the monomer is irradiated with light or having a structure that generates radicals due to a self-cleavage reaction that occurs when the monomer is irradiated with light.

Moreover, long-term exposure to light having wavelength components near the 300 nm range may cause deterioration of the structures inside the panel of the liquid crystal display device, thereby impairing the performance of the display device. Therefore, from the perspective of maintaining display quality, it is effective to use one of the abovementioned monomers that has a structure that generates radicals when irradiated with light, as well as to shorten the irradiation time necessary for the polymerization reaction. Furthermore, it is preferable that the abovementioned monomer having a structure that generates radicals when the monomer is irradiated with light have a structure that can efficiently generate radicals when irradiated with light containing wavelength components of 300 nm or higher, and more preferably when irradiated with light containing wavelength components of 350 nm or higher.

Examples of monomers having a structure that generates radicals due to a hydrogen abstraction reaction that occurs when the monomer is irradiated with light include a compound represented by chemical formula (4) below.

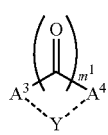
(4)

where:
$A^3$ represents an aromatic ring;
$A^4$ represents the same aromatic ring as $A^3$, a different aromatic ring, or a $C_1$-$C_{12}$ linear or branched alkyl group or alkenyl group;
at least one of $A^3$ and $A^4$ represents an -$Sp^3$-P group;
at least one of the aromatic rings represented by $A^3$ and $A^4$ is a benzene ring or a biphenyl ring;
the hydrogen atoms in $A^3$ and $A^4$ may be replaced by an -$Sp^3$-P group, halogen atoms, a —CN group, —$NO_2$ group, —NCO group, —NCS group, —OCN group, —SCN group, —$SF_5$ group, or a $C_1$-$C_{12}$ alkyl, alkenyl, or aralkyl group. The alkyl group or alkenyl group may be linear or branched;
two neighboring hydrogen atoms in $A^3$ and $A^4$ may be replaced by a $C_1$-$C_{12}$ linear or branched alkylene group or alkenylene group such that $A^3$ and $A^4$ have a ring structure;
the hydrogen atoms in the alkyl group, alkenyl group, alkylene group, alkenylene group, or aralkyl group of $A^3$ and $A^4$ may be replaced by an -$Sp^3$-P group;
the —$CH^2$— groups in the alkyl group, alkenyl group, alkylene group, alkenylene group, or aralkyl group of $A^3$ and $A^4$ may be replaced by an —O— group, —S— group, —NH— group, —CO— group, —COO— group, —OCO— group, —O—COO— group, —$OCH_2$— group, —$CH_2O$— group, —$SCH_2$— group, —$CH_2S$— group, —$N(CH_3)$— group, —$N(C_2H_5)$— group, —$N(C_3H_7)$— group, —$N(C_4H_9)$— group, —$CF_2O$— group, —$OCF_2$— group, —$CF_2S$— group, —$SCF_2$— group, —$N(CF_3)$— group, —$CH_2CH_2$— group, —$CF_2CH_2$— group, —$CH_2CF_2$— group, —$CF_2CF_2$— group, —CH═CH— group, —CF═CF— group, —C≡C— group, —CH═CH—COO— group, or —OCO—CH═CH— group as long as there are no oxygen atoms, sulfur atoms, or nitrogen atoms adjacent to one another;

P represents a radical-polymerizable group;
$Sp^3$ represents a direct bond or a $C_1$-$C_6$ linear, branched, or ring-shaped alkylene group or alkyleneoxy group;
$m^1$ is 1 or 2;
the dotted line connecting $A^3$ and Y and the dotted line connecting $A^4$ and Y indicate that there may be a bond between $A^3$ and $A^4$ via Y; and
Y represents a direct bond or a —$CH_2$— group, —$CH_2CH_2$— group, —CH═CH— group, —O— group, —S— group, —NH— group, —$N(CH_3)$— group, —$N(C_2H_5)$— group, —$N(C_3H_7)$— group, —$N(C_4H_9)$— group, —$OCH_2$— group, —$CH_2O$— group, —$SCH_2$— group, or —$CH_2S$— group.

More specific examples of compounds represented by chemical formula (4) include a compound represented by any one of chemical formulas (6-1) to (6-8).

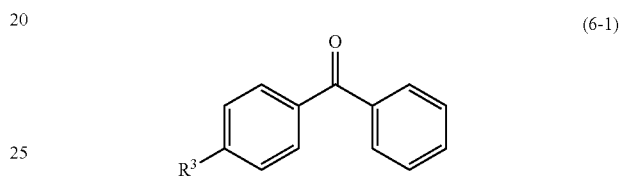
(6-1)

(6-2)

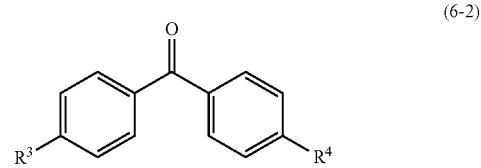
(6-3)

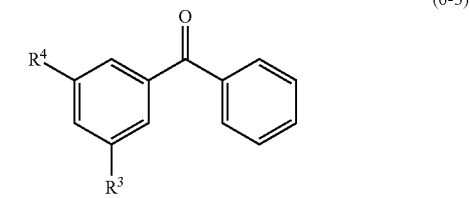
(6-4)

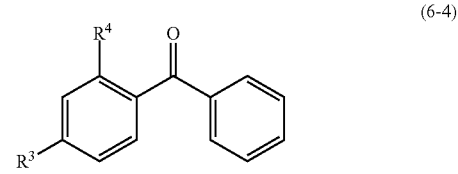
(6-5)

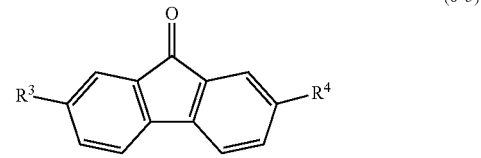
(6-6)

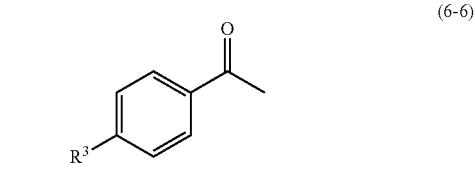
(6-7)

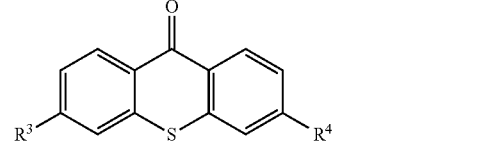

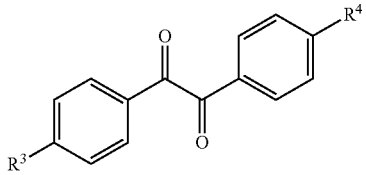

(6-8)

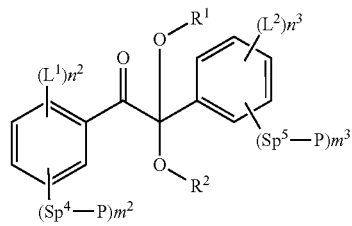

(5)

where:

$R^3$ and $R^4$ may be the same or different and each represents an $Sp^8$-P group, a hydrogen atom, a halogen atom, a —CN group, —NO$_2$ group, —NCO group, —NCS group, —OCN group, —SCN group, —SF$_5$ group, a $C_1$-$C_{12}$ linear or branched alkyl group or aralkyl group, or a phenyl group;

at least one of $R^3$ and $R^4$ includes an -$Sp^8$-P group;

P represents a radical-polymerizable group;

$Sp^8$ represents a direct bond or a $C_1$-$C_6$ linear, branched, or ring-shaped alkylene group or alkyleneoxy group;

if at least one of $R^3$ and $R^4$ is a $C_1$-$C_{12}$ alkyl group or aralkyl group or a phenyl group, the hydrogen atoms in $R^3$ and $R^4$ may be replaced by fluorine atoms, chlorine atoms, or an -$Sp^8$-P group; and the —CH$^2$— groups in $R^3$ and $R^4$ may be replaced by an —O— group, —S— group, —NH— group, —CO— group, —COO— group, —OCO— group, —O—COO— group, —OCH$_2$— group, —CH$_2$O— group, —SCH$_2$— group, —CH$_2$S— group, —N(CH$_3$)— group, —N(C$_2$H$_5$)— group, —N(C$_3$H$_7$)— group, —N(C$_4$H$_9$)— group, —CF$_2$O— group, —OCF$_2$— group, —CF$_2$S— group, —SCF$_2$— group, —N(CF$_3$)— group, —CH$_2$CH$_2$— group, —CF$_2$CH$_2$— group, —CH$_2$CF$_2$— group, —CF$_2$CF$_2$— group, —CH=CH— group, —CF=CF— group, —C≡C— group, —CH=CH—COO— group, or —OCO—CH=CH— group as long as there are no oxygen atoms, sulfur atoms, or nitrogen atoms adjacent to one another.

Compounds having structures represented by one of chemical formulas (6-1) to (6-6) absorb light of wavelengths up to near 380 nm. Compounds having structures represented by chemical formulas (6-7) or (6-8) absorb light of wavelengths up to near 430 nm. As a result, using a compound that has a structure represented by one of chemical formulas (6-1) to (6-8) allows the polymerization reaction catalyzed by irradiation of the compound with light during the process for manufacturing the liquid crystal display device to be sped up even if light of shorter wavelengths (light with a wavelength less than 300 nm, for example) is not used, thereby enabling an increase in throughput. Furthermore, compounds represented by chemical formulas (6-7) or (6-8) have a broader light absorption spectrum and better light use efficiency than compounds represented by one of chemical formulas (6-1) to (6-6). As a result, the pair of substrates of the liquid crystal display device can be irradiated with light to polymerize the radical-polymerizable monomer even after polarizing plates are attached to each of the substrates.

Examples of monomers having a structure that generates radicals due to a self-cleavage reaction that occurs when the monomer is irradiated with light include compounds represented by chemical formula (5) below.

where:

$R^1$ represents an -$Sp^6$-P group or a $C_1$-$C_4$ linear or branched alkyl group or alkenyl group;

$R^2$ represents an -$Sp^7$-P group or a $C_1$-$C_4$ linear or branched alkyl group or alkenyl group;

P represents the same or a different radical-polymerizable group, and there are a total of two or more P groups;

$Sp^4$ represents a direct bond or a $C_1$-$C_6$ linear, branched, or ring-shaped alkylene group, alkyleneoxy group, or alkylene carbonyloxy group. When $m^2$ is 2 or higher, the $Sp^4$ groups may be the same or different;

$Sp^5$ represents a direct bond or a $C_1$-$C_6$ linear, branched, or ring-shaped alkylene group, alkyleneoxy group, or alkylene carbonyloxy group. When $m^3$ is 2 or higher, the $Sp^5$ groups may be the same or different;

$Sp^6$ represents a $C_1$-$C_6$ linear, branched, or ring-shaped alkylene group, alkyleneoxy group, or alkylene carbonyloxy group;

$Sp^7$ represents a $C_1$-$C_6$ linear, branched, or ring-shaped alkylene group, alkyleneoxy group, or alkylene carbonyloxy group;

$L^1$ represents an —F group, —OH group, a $C_1$-$C_{12}$ linear or branched alkyl group or alkenyl group, or an aralkyl group. When $n^2$ is 2 or higher, the $L^1$ groups may be the same or different;

in two $L^1$ groups, when two adjacent carbon atoms in the aromatic rings are bonded to one another, those carbon atoms may be bonded to one another such that the overall group has a ring-shaped structure. In this case, the two $L^1$ groups may be the same or different and each is a $C_1$-$C_{12}$ linear or branched alkylene group or alkenylene group;

$L^2$ represents an —F group, —OH group, a $C_1$-$C_{12}$ linear or branched alkyl group or alkenyl group, or an aralkyl group. When $n^3$ is 2 or higher, the $L^2$ groups may be the same or different;

In two $L^2$ groups, when two adjacent carbon atoms in the aromatic rings are bonded to one another, those carbon atoms may be bonded to one another such that the overall group has a ring-shaped structure. In this case, the two $L^2$ groups may be the same or different and each is a $C_1$-$C_{12}$ linear or branched alkylene group or alkenylene group;

one or more hydrogen atoms in the alkyl group, alkenyl group, alkylene group, alkenylene group, or aralkyl group of $L^1$ and $L^2$ may be replaced by an —F group or an —OH group;

the —CH$^2$— groups in the alkyl group, alkenyl group, alkylene group, alkenylene group, or aralkyl group of $L^1$ and $L^2$ may each be replaced by an —O— group, —S— group, —NH— group, —CO— group, —COO— group, —OCO— group, —O—COO— group, —OCH$_2$— group, —CH$_2$O— group, —SCH$_2$— group, —CH$_2$S— group, —N(CH$_3$)— group, —N(C$_2$H$_5$)— group, —N(C$_3$H$_7$)— group, —N(C$_4$H$_9$)— group, —CF$_2$O— group, —OCF$_2$— group, —CF$_2$S— group, —SCF$_2$— group, —N(CF$_3$)— group, —CH$_2$CH$_2$— group, —CF$_2$CH$_2$— group, —CH$_2$CF$_2$— group, —CF$_2$CF$_2$— group, —CH═CH— group, —CF═CF— group, —C≡C— group, —CH═CH—COO— group, —OCO—CH═CH— group, -Sp$^4$-P group, or -Sp$^5$-P group as long as there are no oxygen atoms, sulfur atoms, or nitrogen atoms adjacent to one another;

m$^2$ is an integer from 1 to 3;
m$^3$ is an integer from 0 to 3;
n$^2$ is an integer from 0 to 4;
n$^3$ is an integer from 0 to 4;
the sum of m$^2$ and n$^2$ is an integer from 1 to 5;
the sum of m$^3$ and n$^3$ is an integer from 0 to 5; and
the sum of m$^2$ and m$^3$ is an integer from 1 to 6.

Examples of compounds represented by chemical formula (5) include a compound represented by chemical formula (7) below.

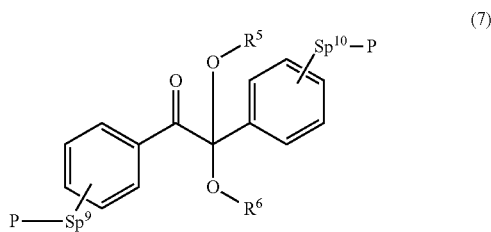

(7)

where:
R$^5$ represents a C$_1$-C$_4$ linear or branched alkyl group or alkenyl group;
R$^6$ represents a C$_1$-C$_4$ linear or branched alkyl group or alkenyl group;
P represents the same or a different radical-polymerizable group;
Sp$^9$ represents a direct bond or a C$_1$-C$_6$ linear, branched, or ring-shaped alkylene group, alkyleneoxy group, or alkylene carbonyloxy group; and
Sp$^{10}$ represents a direct bond or a C$_1$-C$_6$ linear, branched, or ring-shaped alkylene group, alkyleneoxy group, or alkylene carbonyloxy group.

Examples of P in compounds represented by chemical formula (1) and chemical formulas (4) to (7) include a (meta)acryloyloxy group, a (meta)acryloyl amino group, a vinyl group, and a vinyloxy group.

The abovementioned liquid crystal material may exhibit negative dielectric anisotropy or positive dielectric anisotropy.

The abovementioned liquid crystal display device may further include a second electrode provided on the second substrate.

In the liquid crystal display device, dielectric protrusions may be provided on at least one of the first electrode and the second electrode on the surface of the electrode that is in contact with the liquid crystal layer.

Openings may be formed in at least one of the first electrode and the second electrode.

The dielectric protrusions may be line-shaped or generally circle-shaped when viewed in a plan view.

The openings may be line-shaped or generally circle-shaped when viewed in a plan view.

The liquid crystal display device may further include a third electrode provided on the first substrate.

The first electrode and third electrode may both be comb-shaped electrodes.

The first electrode may have a flat plate shape, the third electrode may be comb-shaped, and there may be an insulating layer provided between the first electrode and the third electrode.

Effects of the Invention

The present invention can provide a liquid crystal display device with which a high display quality can be maintained even when the device is used in high temperature or high humidity environments.

DETAILED DESCRIPTION OF EMBODIMENTS

Embodiments of the present invention will be explained in detail below with reference to figures. However, the present invention is not limited to only these embodiments.

The present liquid crystal display device exhibits excellent display properties when used as the display in a television, personal computer, mobile telephone, or information display, for example.

Embodiment 1

Figure 1:
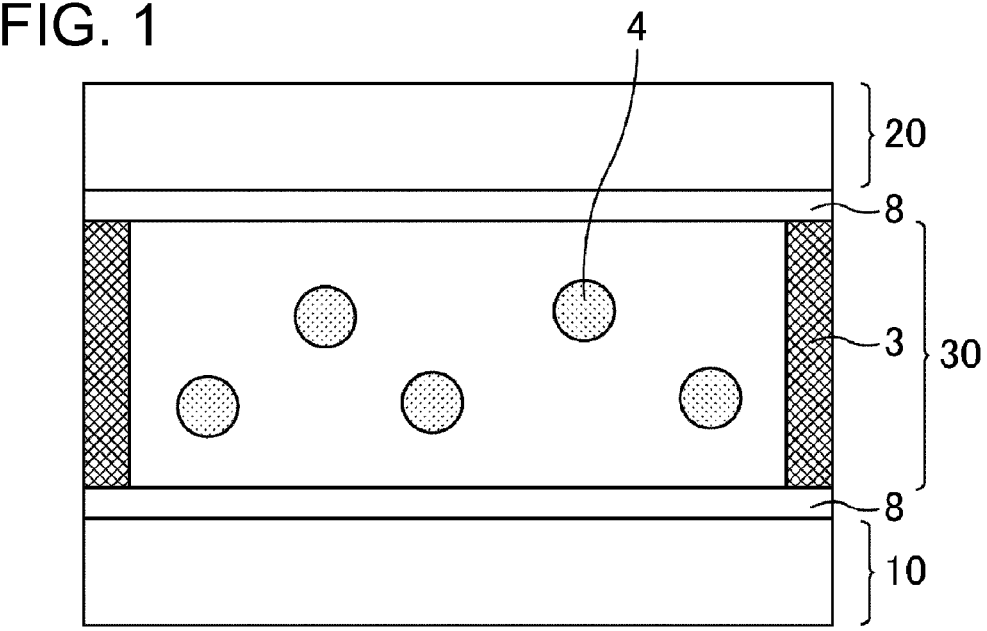
FIG. 1 is a cross-sectional view schematically illustrating a liquid crystal display device according to Embodiment 1 before a PSA polymerization process.
Figure 2:
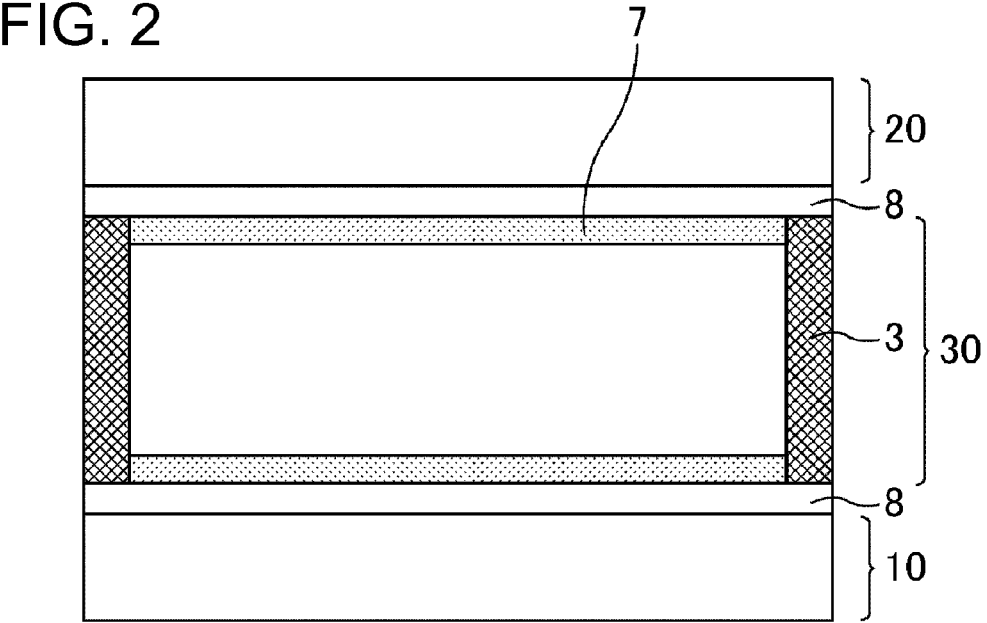
FIG. 2 is a cross-sectional view schematically illustrating the liquid crystal display device according to Embodiment 1 after the PSA polymerization process.

An example of a liquid crystal display device according to Embodiment 1 will be described below. FIGS. 1 and 2 are cross-sectional views schematically illustrating the liquid crystal display device according to Embodiment 1. FIG. 1 shows the liquid crystal display device before a PSA polymerization process, and FIG. 2 shows the liquid crystal display device after the PSA polymerization process. As shown in FIGS. 1 and 2, the liquid crystal display device according to Embodiment 1 includes an array substrate 10, a color filter substrate 20, and a liquid crystal layer 30 sandwiched between this pair of substrates (the array substrate 10 and the color filter substrate 20). The array substrate 10 is an insulating and transparent substrate made of a material such as glass. Various types of wires, pixel electrodes, thin film transistors (TFTs), and the like are formed on this transparent substrate. The color filter substrate 20 is an insulating and transparent substrate made of a material such as glass. A color filter, black matrix, common electrode, and the like are formed on this transparent substrate. An alignment film 8 is provided on both the array substrate 10 and on the color filter substrate 20 on the surfaces thereof that are in contact with the liquid crystal layer 30.

As shown in FIG. 1, before the PSA polymerization process, the liquid crystal layer 30 contains a liquid crystal material and a radical-polymerizable monomer 4. The radical-polymerizable monomer 4 is a compound represented by chemical formula (1). More specifically, the radical-polymerizable monomer 4 is a compound represented by chemical formula (2). Even more specifically, the radical-polymerizable monomer 4 is a compound represented by one of chemical formulas (3-1) to (3-8).

The radical-polymerizable monomer 4 generates radicals when the liquid crystal layer 30 is irradiated with light. With those radicals as the activated species, the radical-polymerizable groups in the radical-polymerizable monomer 4 begin to undergo chain polymerization. This proceeds until the radical-polymerizable monomer 4 has been completely polymerized. As shown in FIG. 2, the polymer formed due to this polymerization process is deposited as a polymer layer (PSA layer) 7 on the alignment films 8 formed on the substrates 10 and 20.

As described above, when a liquid crystal display device is used in a high temperature or high humidity environment, discolorations and display irregularities can occur due to infiltration of water moisture, impurities, or the like into the liquid crystal layer. When water moisture, impurities, or the like infiltrate into the liquid crystal layer, the voltage holding ratio (VHR) of the display device decreases. The radical-polymerizable monomer 4 has an amide group and can therefore form hydrogen bonds with water moisture, water-soluble impurities, and the like. As a result, using the radical-polymerizable monomer 4 to form the polymer layer 7 can reduce the amount of residual water moisture, impurities, or the like in the liquid crystal layer, thereby inhibiting a decrease in VHR. Therefore, the present embodiment can provide a liquid crystal display device with which a high display quality can be maintained even when the device is used in high temperature or high humidity environments.

Moreover, in conventional PSA technologies, a polymerization initiator is typically used. However, using a polymerization initiator (such as Irgacure 651, for example) can result in a decrease in VHR due to impurities that are cleaved from the monomer when irradiated with UV light and remain suspended in the liquid crystal. In Embodiment 1, using the radical-polymerizable monomer 4 allows a high VHR to be maintained because the radical-polymerizable monomer 4 generates radicals on its own. Use of a polymerization initiator is not required, and therefore no impurities form due to use of a polymerization initiator. Moreover, the radical-polymerizable monomer 4 has two polymerizable groups and therefore tends to stay embedded in the polymer layer 7 when the polymer layer 7 is formed. This reduces the likelihood that impurities from the radical-polymerizable monomer 4 will remain in the liquid crystal layer, thereby reducing the likelihood of a decrease in VHR.

As shown in FIG. 2, in Embodiment 1 the polymer layers 7 are formed on top of the alignment films 8 on the array substrate 10 and the color filter substrate 20. Moreover, a sealing material 3 is formed on the alignment films 8 along the outer edges of the array substrate 10 and the color filter substrate 20. The liquid crystal layer 30 is sealed between the array substrate 10 and the color filter substrate 20 by the sealing material 3. Moreover, the liquid crystal layer 30 is irradiated with light only after being sealed between the substrates using the sealing material 3, and therefore the polymer layers 7 are formed within the region enclosed by the sealing material 3. A material that hardens due to application of heat, a material that hardens due to irradiation with light, or a material that hardens due to either application of heat or irradiation with light may be used for the sealing material.

In Embodiment 1, as long as one or more radical-polymerizable monomers is used during the PSA polymerization process, the polymer layers can be formed and the liquid crystal molecules can be aligned in a prescribed direction relative to the substrate surfaces even if a voltage of a magnitude greater than or equal to a threshold value is not applied to the liquid crystal layer 30. For example, for horizontal alignment modes such as IPS mode or FFS mode, the polymer layers can be formed and the alignment of the liquid crystal molecules can be controlled during the PSA polymerization process even if a voltage of a magnitude greater than or equal to a threshold value is not applied to the liquid crystal layer.

Moreover, if the liquid crystal layer 30 is irradiated with light while a voltage of a magnitude greater than or equal to a threshold value is applied thereto, the polymer will form in a manner that maintains the alignment of the liquid crystal molecules when the voltage of a magnitude greater than or equal to a threshold value was applied. In this way, the polymer layers that form take on a defined structure that maintains the pretilt angle of the liquid crystal molecules even when the applied voltage is later removed.

An alternative configuration of the liquid crystal display device according to Embodiment 1 will be described in detail below.

The alignment films 8 may be horizontal alignment films or vertical alignment films. A vertical alignment film causes the liquid crystal molecules to align vertically relative to the substrate surfaces when no voltage is applied. An alignment treatment may be applied to create such a vertical alignment film. In this vertical alignment state, the average initial angle of inclination of the liquid crystal molecules relative to the substrate surfaces should be 80° to 90°, or preferably 85° to 90°. "Angle of inclination" refers to the angle between the long axis of a liquid crystal molecule and the substrate surfaces and is expressed as an angle from 0° to 90°. "Average angle of inclination" is also sometimes called "tilt angle". Moreover, the "average initial angle of inclination" is the average angle of inclination of the liquid crystal molecules relative to each of the substrates when no voltage is applied and will be referred to simply as "pretilt angle" below. A horizontal alignment film causes the liquid crystal molecules to align horizontally relative to the substrate surfaces when no voltage is applied. An alignment treatment may be applied to create such a horizontal alignment film. In this horizontal alignment state, the average initial angle of inclination of the liquid crystal molecules relative to the substrate surfaces should be 0° to 30°, or preferably 0° to 10°. Examples of alignment treatment methods include rubbing methods, photoalignment methods, and the like.

Examples of materials for the alignment films 8 include polyimides, polyamic acids, polysiloxanes, and the like.

Moreover, the alignment films 8 may be photoalignment films. Examples of photoalignment films include films that align liquid crystal molecules by utilizing the cis-trans change of azobenzene, the dimer anisotropy of polyvinyl cinnamate, anisotropic decomposition that occurs due to anisotropic light absorption (photolytic films), or the like.

The liquid crystal layer 30 is filled with a liquid crystal material that aligns in a certain direction when a prescribed voltage is applied thereto. The liquid crystal material may exhibit positive dielectric anisotropy or negative dielectric anisotropy, and the alignment of the liquid crystal molecules in the liquid crystal material is controlled by applying a voltage of a magnitude greater than or equal to a threshold value.

In the liquid crystal display device according to Embodiment 1, the array substrate 10, liquid crystal layer 30, and color filter substrate 20 are arranged in order from the rear side to the viewing side of the liquid crystal display device. Polarizing plates are provided on the rear side of the array substrate 10 and on the viewing side of the color filter substrate 20. These polarizing plates may be circularly polarizing plates, or retardation plates may be further provided on these polarizing plates.

The liquid crystal display device according to Embodiment 1 may be a transmissive, reflective, or transmissive-reflective display device. If the liquid crystal display device of Embodiment 1 is a transmissive or transmissive-reflective display device, the liquid crystal display device also includes a backlight. The backlight is positioned behind the rear side of the array substrate 10 such that light passes through the array substrate 10, the liquid crystal layer 30, and then the color filter substrate 20 in order. If the liquid crystal display device is a reflective or a transmissive-reflective display device, the array substrate 10 further includes a reflector for reflecting external light. Moreover, the polarizing plate of the color filter substrate 20 must be a circularly polarizing plate equipped with a so-called µ/4 retardation plate at least in the region in which reflected light will be used to display images.

In the liquid crystal display device according to Embodiment 1, the monomer ingredients to use can be determined by dismantling an existing liquid crystal display device (such as a mobile telephone, monitor, or LCD television, for example) or information display and then using a chemical analysis method such as nuclear magnetic resonance (NMR), Fourier transform infrared spectroscopy (FT-IR), or mass spectrometry (MS) to analyze the monomer ingredients used in the polymer layer.

Embodiment 2

Embodiment 2 is identical to Embodiment 1 except in that another monomer that has a structure that generates radicals when the monomer is irradiated with light is used in addition to the radical-polymerizable monomer used in Embodiment 1.

Figure 3:
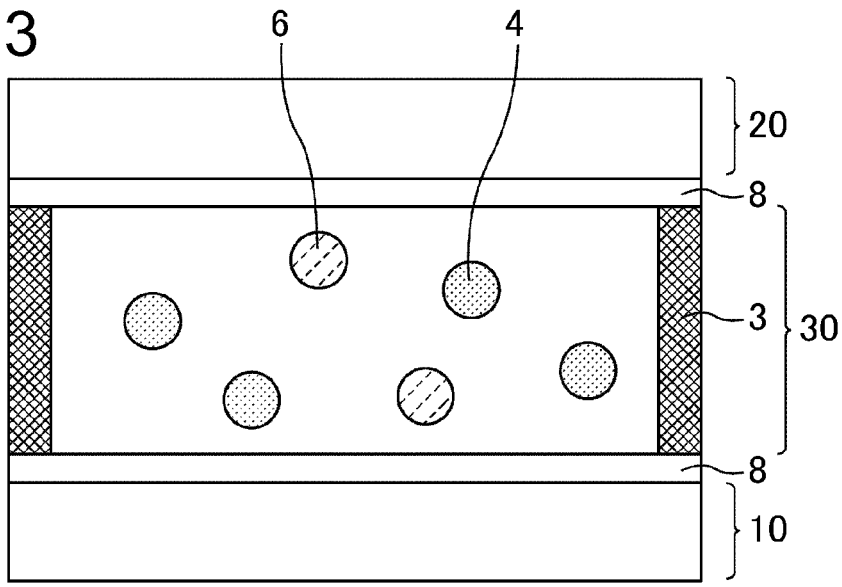
FIG. 3 is a cross-sectional view schematically illustrating a liquid crystal display device according to Embodiment 2 before a PSA polymerization process.
Figure 4:
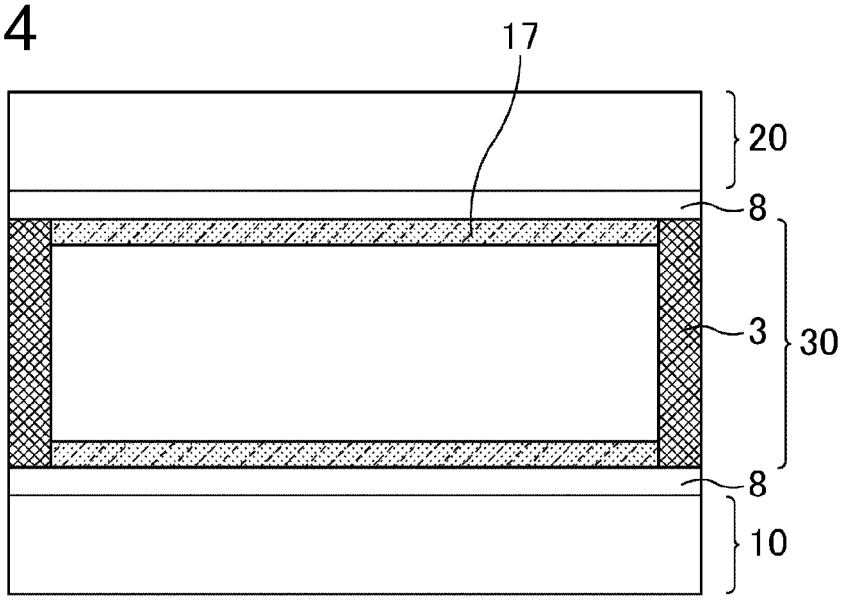
FIG. 4 is a cross-sectional view schematically illustrating the liquid crystal display device according to Embodiment 2 after the PSA polymerization process.

An example of a liquid crystal display device according to Embodiment 2 will be described below. FIGS. 3 and 4 are cross-sectional views schematically illustrating the liquid crystal display device according to Embodiment 2. FIG. 3 shows the liquid crystal display device before a PSA polymerization process, and FIG. 4 shows the liquid crystal display device after the PSA polymerization process. As shown in FIGS. 3 and 4, the liquid crystal display device according to Embodiment 2 includes an array substrate 10, a color filter substrate 20, and a liquid crystal layer 30 sandwiched between this pair of substrates (the array substrate 10 and the color filter substrate 20). The array substrate 10 is an insulating and transparent substrate made of a material such as glass. Various types of wires, pixel electrodes, TFTs, and the like are formed on this transparent substrate. The color filter substrate 20 is an insulating and transparent substrate made of a material such as glass. A color filter, black matrix, common electrode, and the like are formed on this transparent substrate. An alignment film 8 is provided on both the array substrate 10 and on the color filter substrate 20 on the surfaces thereof that are in contact with the liquid crystal layer 30.

As shown in FIG. 3, before the PSA polymerization process, the liquid crystal layer 30 contains a liquid crystal material, a first radical-polymerizable monomer 4, and a second radical-polymerizable monomer 6. The first radical-polymerizable monomer 4 is a compound represented by chemical formula (1). More specifically, the first radical-polymerizable monomer 4 is a compound represented by chemical formula (2). Even more specifically, the first radical-polymerizable monomer 4 is a compound represented by one of chemical formulas (3-1) to (3-8). The second radical-polymerizable monomer 6 is a monomer that has a structure that generates radicals when the monomer is irradiated with light. The second radical-polymerizable monomer 6 may be a compound that has a structure that generates radicals due to a hydrogen abstraction reaction that occurs when the monomer is irradiated with light and can be represented by chemical formula (4) or chemical formulas (6-1) to (6-8), or the second radical-polymerizable monomer 6 may be a compound that has a structure that generates radicals due to a self-cleavage reaction that occurs when the monomer is irradiated with light and can be represented by chemical formulas (5) or (7). Using an additional monomer that has a structure that generates radicals when the monomer is irradiated with light allows the polymerization reaction to be started and to progress without the need to add a polymerization initiator. Using an additional monomer also further prevents a decrease in VHR.

When the liquid crystal layer 30 is irradiated with light, the first radical-polymerizable monomer 4 and the second radical-polymerizable monomer 6 each independently generate radicals. With those radicals as the activated species, the radical-polymerizable groups in the first radical-polymerizable monomer 4 and the second radical-polymerizable monomer 6 begin to undergo chain polymerization. This proceeds until the monomers have been completely polymerized. As shown in FIG. 4, the polymer formed due to this polymerization process is deposited as a polymer layer (PSA layer) 17 on the alignment films 8 formed on the substrates 10 and 20.

As shown in FIG. 4, in Embodiment 2 the polymer layers 17 are formed on top of the alignment films 8 on the array substrate 10 and the color filter substrate 20. Moreover, a sealing material 3 is formed on the alignment films 8 along the outer edges of the array substrate 10 and the color filter substrate 20. The liquid crystal layer 30 is sealed between the array substrate 10 and the color filter substrate 20 by the sealing material 3. Moreover, the liquid crystal layer 30 is irradiated with light only after being sealed between the substrates using the sealing material 3, and therefore the polymer layers 17 are formed within the region enclosed by the sealing material 3.

As in Embodiment 1, Embodiment 2 can provide a liquid crystal display device with which a high display quality can be maintained even when the device is used in high temperature or high humidity environments. Furthermore, using an additional monomer that has a structure that generates radicals when the monomer is irradiated with light allows the polymer layers to be formed in a shorter time during the irradiation process, thereby enabling an increase in throughput.

Exemplary Embodiment 1

Exemplary Embodiment 1 is an MVA mode version of the liquid crystal display device according to Embodiment 1.

At least one of a first electrode of a first substrate and a second electrode of a second substrate may have, on the surface of the electrode in contact with a liquid crystal layer, protrusions made from a dielectric material. Alternatively, at least one of the first electrode and the second electrode may have openings. One example of dielectric protrusions is wall-shaped dielectric protrusions that protrude from the electrode towards the liquid crystal layer and are formed such that the protrusions are line-shaped when viewed in a plan view. Such wall-shaped dielectric protrusions are also known as "ribs". One example of openings is openings formed in the electrode such that the openings are line-shaped when viewed in a plan view. Such openings are also known as "slits". This display mode, in which the alignment of liquid crystal molecules is controlled by forming ribs and/or slits, is also known as multi-domain vertical alignment (MVA) mode. This example of an MVA liquid crystal display device is configured as follows. The display device has a pair of substrates, each of which includes an electrode. Ribs made from a dielectric material are formed on the electrode of one of the substrates. The ribs are formed on the surface of the electrode that is in contact with the liquid crystal layer. Slits are formed in the electrode of the other substrate.

Figure 5:
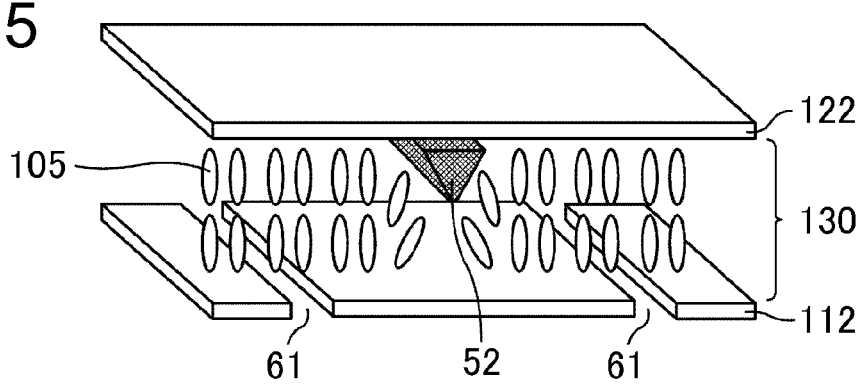
FIG. 5 is a perspective view schematically illustrating a state in which no voltage is applied to a liquid crystal display device according to Exemplary Embodiment 1.
Figure 6:
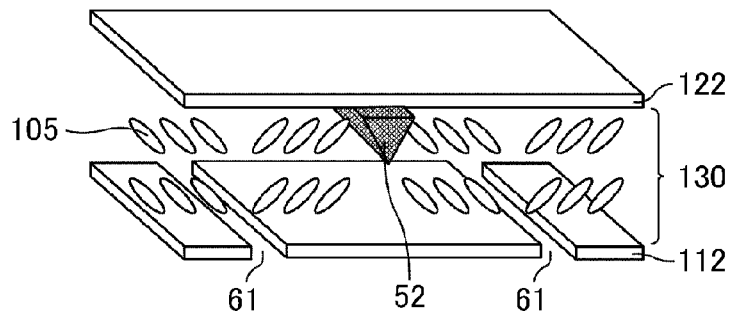
FIG. 6 is a perspective view schematically illustrating a state in which a voltage is applied to the liquid crystal display device according to Exemplary Embodiment 1.

FIGS. 5 and 6 are perspective views schematically illustrating the liquid crystal display device according to Exemplary Embodiment 1. FIG. 5 shows the liquid crystal display device when no voltage is applied, and FIG. 6 shows the liquid crystal display device when a voltage is applied. In Exemplary Embodiment 1, slits 61 are formed in a first electrode (pixel electrode) 112 of a first substrate. Moreover, ribs 52 are formed on a second electrode (common electrode) 122 of a second substrate. The ribs are formed on the surface of the second electrode that is in contact with the liquid crystal layer 130. A vertical alignment film may be formed on the surfaces of both substrates, and a liquid crystal material that exhibits negative dielectric anisotropy can be used for the liquid crystal material. A photosensitive acrylic resin can be used as the material for the ribs, for example. Moreover, the ribs and slits can be formed using photolithography.

As shown in FIG. 5, when no voltage is applied, almost all of the liquid crystal molecules 105 (except for some of the liquid crystal molecules 105 that are directly adjacent to the ribs 52) align in the vertical direction with respect to the substrate surfaces. As shown in FIG. 6, when a voltage is applied, the liquid crystal molecules 105 near the slits 61 tilt towards the first electrode. The liquid crystal molecules 105 near the ribs 52 tilt towards the outer surfaces thereof. The liquid crystal molecules 105 between one of the ribs 52 and one of the slits 61 are tilted in approximately the same direction. In Exemplary Embodiment 1, the angle of inclination of the liquid crystal molecules can be controlled according to the magnitude of the voltage applied to the liquid crystal layer, thereby enabling display of gradations. By controlling the alignment of the liquid crystal molecules in this way, images can be displayed on the display device.

Figure 7:
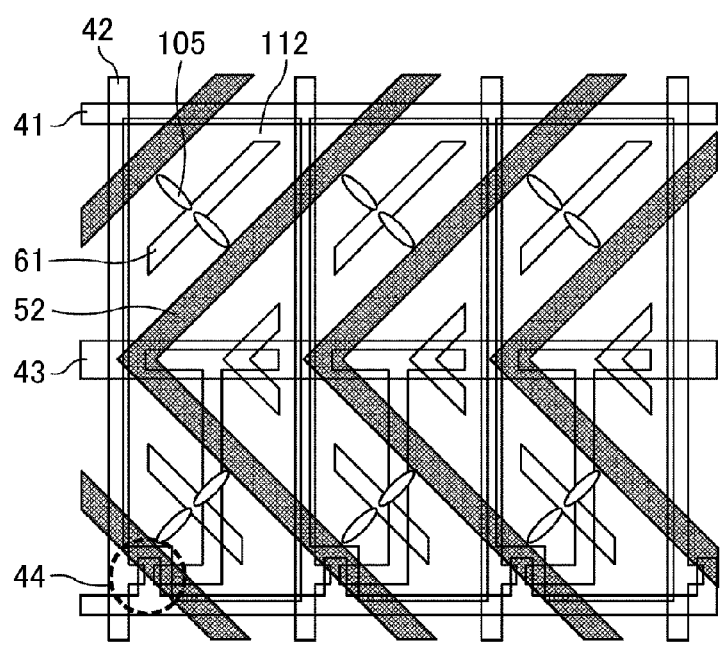
FIG. 7 is a plan view schematically illustrating a single pixel in the liquid crystal display device according to Exemplary Embodiment 1.
Figure 8:
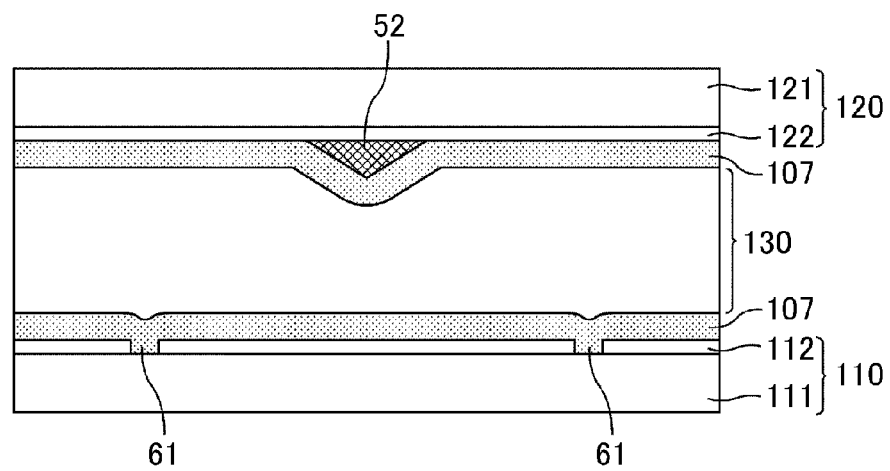
FIG. 8 is a cross-sectional view schematically illustrating the liquid crystal display device according to Exemplary Embodiment 1 after a PSA polymerization process.

FIG. 7 is a plan view schematically illustrating a single pixel in the liquid crystal display device according to Exemplary Embodiment 1 when a voltage is applied. FIG. 8 is a cross-sectional view schematically illustrating the liquid crystal display device according to Exemplary Embodiment 1 after a PSA polymerization process. As shown in FIG. 8, the first substrate (array substrate) 110 includes a glass substrate 111 on which the pixel electrode 112 is formed. The second substrate (color filter substrate) 120 includes a glass substrate 121 on which the common electrode 122 is formed. In FIG. 8, components such as wires, color filters, and alignment films are not shown.

As shown in FIG. 7, the first substrate (array substrate) includes a plurality of mutually parallel gate signal lines 41, a plurality of source signal lines 42, and a plurality of auxiliary capacitance (Cs) lines 43. An insulating film is disposed between each of these wiring layers. The gate signal lines 41 and auxiliary capacitance (Cs) lines 43 run parallel to one another and intersect with the plurality of source signal lines 42. Near the intersections of the gate signal lines 41 and the source signal lines 42, TFTs 44 are provided as switching elements for controlling how the pixels are driven. The TFTs 44 are three-terminal field-effect transistors, and each includes a semiconductor layer, a gate electrode, a source electrode, and a drain electrode. The gate signal lines 41 and source signal lines 42 are each connected to each of the electrodes of the TFTs 44. It should be noted that in Exemplary Embodiment 1, a single pixel electrode 112 is divided into a plurality of sub-pixel electrodes, and a TFT is provided for each sub-pixel electrode. Each gate wire may be configured to enable multi-drive for controlling two sub-pixel electrodes.

The second substrate (color filter substrate) includes a light-shielding black matrix (BM) and a plurality of color filters that each only transmits light of a prescribed wavelength. The BM is formed in the gap between each color filter such that the overall BM forms a grid pattern. The BM is arranged to overlap with each of the wires and TFTs on the first substrate, and the color filters are arranged to overlap with the pixel electrodes on the first substrate.

The ribs 52 and slits 61 are line-shaped when viewed in a plan view and are positioned with a prescribed interval left between each. There may be regions in which some of these intervals are different, but it is preferable that essentially all of the ribs 52 and slits 61 have the same prescribed intervals therebetween. This allows a more satisfactory display result to be achieved. The ribs 52 are formed on the common electrode 122. Moreover, it is preferable that a portion of each rib 52 is bent such that that portion of the rib forms a V-shape when viewed in a plan view. In this case, the ribs 52 form a zigzag pattern on the overall substrate. This allows the liquid crystal molecules 105 near the ribs 52 in each pixel to be aligned in 4 different directions and in a well-balanced manner. The common electrode 122 may be formed in a flat plate shape. Each of the slits 61 formed in the pixel electrode 112 has a substantially rectangular shape. A plurality of slits 61 are arranged in a matrix pattern and form a single display surface. It should be noted that here, "a substantially rectangular shape" may include rectangular shapes in which one or more parts of the rectangle are either extruded or cut off, as shown in FIG. 7.

Moreover, as shown in FIG. 8, polymer layers (PSA layers) 107 are formed across the entire surfaces of both substrates, including the pixel electrode 112, the common electrode 122, the parts of the pixel electrode 112 exposed by the slits 61, the ribs 52, and the like. The polymer layers (PSA layers) 107 are formed such that these polymer layers are in contact with the liquid crystal layer 130.

In Exemplary Embodiment 1, the polymer layers (PSA layers) are formed using a radical-polymerizable monomer having an amide group. This makes it possible to provide a liquid crystal display device with which a high display quality can be maintained even when the device is used in high temperature or high humidity environments.

Exemplary Embodiment 2

Exemplary Embodiment 2 is another example of an MVA mode version of the liquid crystal display device according to Embodiment 1.

This additional example of an MVA liquid crystal display device is configured as follows. The display device has a pair of substrates, each of which includes an electrode. Ribs are formed on the electrode on each substrate. The ribs are formed on the surfaces of the electrodes that are in contact with a liquid crystal layer.

Figure 9:
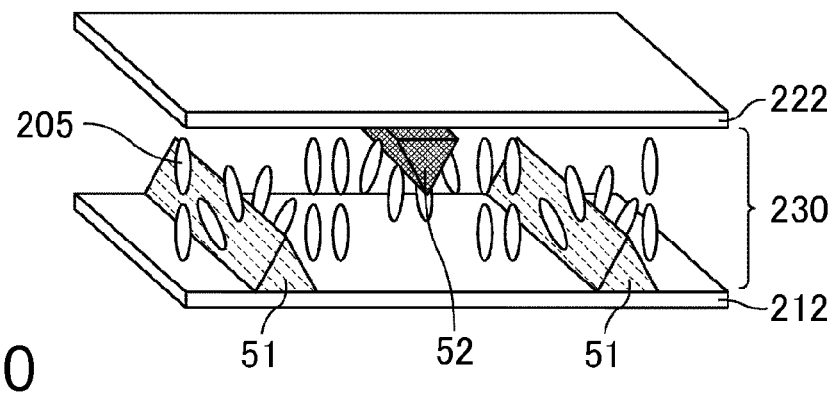
FIG. 9 is a perspective view schematically illustrating a state in which no voltage is applied to a liquid crystal display device according to Exemplary Embodiment 2.
Figure 10:
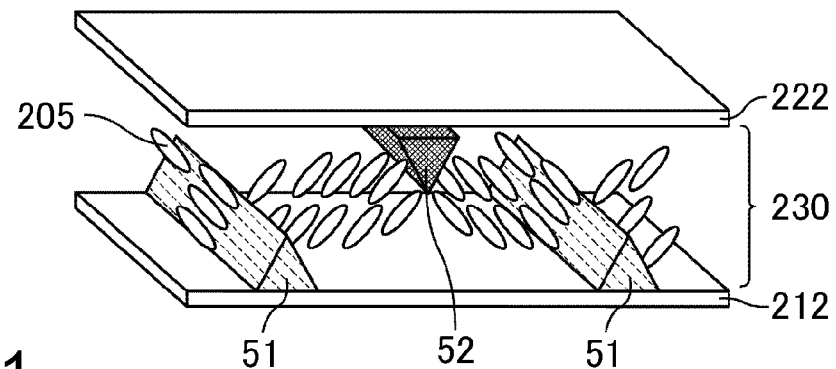
FIG. 10 is a perspective view schematically illustrating a state in which a voltage is applied to the liquid crystal display device according to Exemplary Embodiment 2.

FIGS. 9 and 10 are perspective views schematically illustrating the liquid crystal display device according to Exemplary Embodiment 2. FIG. 9 shows the liquid crystal display device when no voltage is applied, and FIG. 10 shows the liquid crystal display device when a voltage is applied. In Exemplary Embodiment 2, ribs 51 are formed on a first electrode (pixel electrode) 212 of a first substrate. Moreover, ribs 52 are formed on a second electrode (common electrode) 222 of a second substrate. The ribs 51 and 52 are formed on the surfaces of the first electrode 212 and second electrode 222, respectively, that are in contact with a liquid crystal layer 230. A vertical alignment film may be formed on the surfaces of both substrates, and a liquid crystal material that exhibits negative dielectric anisotropy can be used for the liquid crystal material.

As shown in FIG. 9, when no voltage is applied, almost all of the liquid crystal molecules 205 (except for some of the liquid crystal molecules 205 that are directly adjacent to the ribs 51 and 52) align in the vertical direction with respect to the substrate surfaces. As shown in FIG. 10, when a voltage is applied, the liquid crystal molecules 205 near the ribs 51 and 52 tilt towards the outer surfaces thereof. As a result, the liquid crystal molecules 205 between one of the ribs 51 and one of the ribs 52 are tilted in approximately the same direction. In Exemplary Embodiment 2, the angle of inclination of the liquid crystal molecules can be controlled according to the magnitude of the voltage applied to the liquid crystal layer, thereby enabling display of gradations. By controlling the alignment of the liquid crystal molecules in this way, images can be displayed on the display device.

Figure 11:
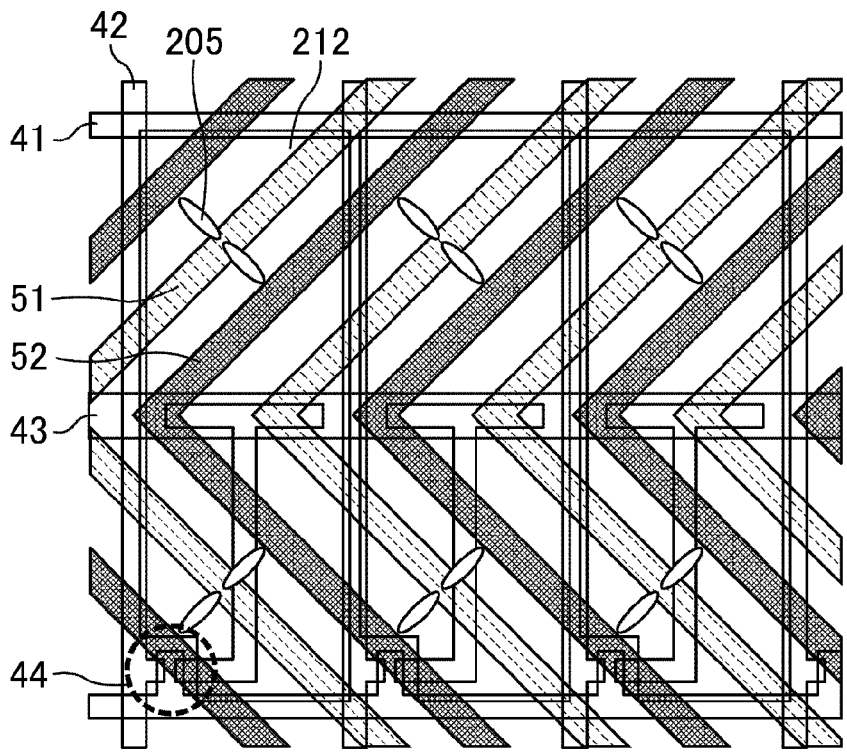
FIG. 11 is a plan view schematically illustrating a single pixel in the liquid crystal display device according to Exemplary Embodiment 2.
Figure 12:
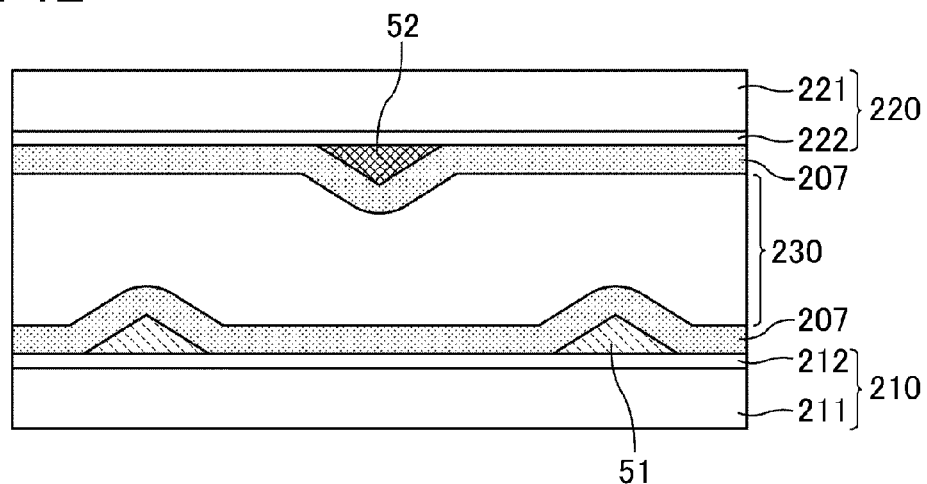
FIG. 12 is a cross-sectional view schematically illustrating the liquid crystal display device according to Exemplary Embodiment 2 after a PSA polymerization process.

FIG. 11 is a plan view schematically illustrating a single pixel in the liquid crystal display device according to Exemplary Embodiment 2 when a voltage is applied. FIG. 12 is a cross-sectional view schematically illustrating the liquid crystal display device according to Exemplary Embodiment 2 after a PSA polymerization process. As shown in FIG. 12, the first substrate (array substrate) 210 includes a glass substrate 211 on which the pixel electrode 212 is formed. The second substrate (color filter substrate) 220 includes a glass substrate 221 on which the common electrode 222 is formed. In FIG. 12, components such as wires, color filters, and alignment films are not shown.

As shown in FIG. 11, the ribs 51 and 52 are line-shaped when viewed in a plan view and are positioned with a prescribed interval left between each. There may be regions in which some of these intervals are different, but it is preferable that essentially all of the ribs 51 and 52 have the same prescribed intervals therebetween. This allows a more satisfactory display result to be achieved. The ribs 51 are formed on the pixel electrode 212, and the ribs 52 are formed on the common electrode 222. Moreover, it is preferable that a portion of each of the ribs 51 and 52 is bent such that that portion of the rib forms a V-shape when viewed in a plan view. In this case, the ribs 51 and 52 form zigzag patterns on the overall substrate. This allows the liquid crystal molecules 205 near the ribs 51 and 52 in each pixel to be aligned in 4 different directions and in a well-balanced manner. Gate signal lines 41, source signal lines 42, auxiliary capacitance (Cs) lines 43, and TFTs 44 are configured the same as in Exemplary Embodiment 1.

Moreover, as shown in FIG. 12, polymer layers (PSA layers) 207 are formed across the entire surfaces of both substrates, including the pixel electrode 212, the common electrode 222, the ribs 51 and 52, and the like. The polymer layers (PSA layers) 207 are formed such that these polymer layers are in contact with the liquid crystal layer 230.

In Exemplary Embodiment 2, the polymer layers (PSA layers) are formed using a radical-polymerizable monomer having an amide group. This makes it possible to provide a liquid crystal display device with which a high display quality can be maintained even when the device is used in high temperature or high humidity environments.

Exemplary Embodiment 3

Exemplary Embodiment 3 is an example of a PVA mode version of the liquid crystal display device according to Embodiment 1.

Patterned vertical alignment (PVA) mode refers to a display mode in which the alignment of liquid crystal molecules is controlled by forming slits in electrodes provided on each substrate in a pair of substrates. This example of a PVA liquid crystal display device is configured as follows. The display device has a pair of substrates, each of which includes an electrode. Slits are formed in each of these electrodes.

Figure 13:
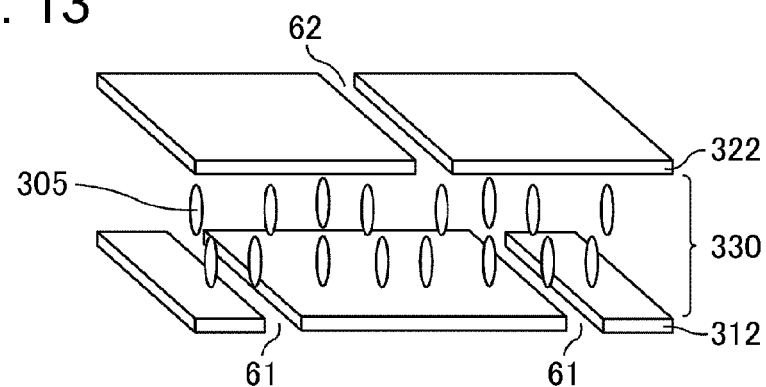
FIG. 13 is a perspective view schematically illustrating a state in which no voltage is applied to a liquid crystal display device according to Exemplary Embodiment 3.
Figure 14:
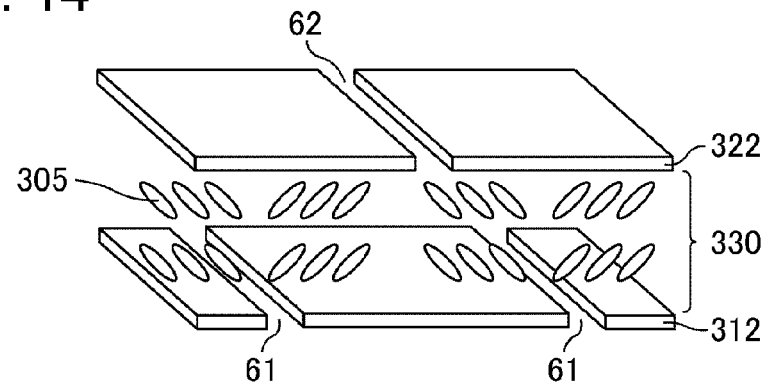
FIG. 14 is a perspective view schematically illustrating a state in which a voltage is applied to the liquid crystal display device according to Exemplary Embodiment 3.

FIGS. 13 and 14 are perspective views schematically illustrating the liquid crystal display device according to Exemplary Embodiment 3. FIG. 13 shows the liquid crystal display device when no voltage is applied, and FIG. 14 shows the liquid crystal display device when a voltage is applied. In Exemplary Embodiment 3, slits 61 are formed in a first electrode (pixel electrode) 312 of a first substrate. Moreover, slits 62 are formed in a second electrode (common electrode) 322 of a second substrate. A vertical alignment film may be formed on the surfaces of both substrates, and a liquid crystal material that exhibits negative dielectric anisotropy can be used for the liquid crystal material.

As shown in FIG. 13, when no voltage is applied, almost all of the liquid crystal molecules 305 align in the vertical direction with respect to the substrate surfaces. As shown in FIG. 14, when a voltage is applied, the liquid crystal molecules 305 near the slits 61 and 62 tilt towards the electrodes. As a result, the liquid crystal molecules 305 between one of the slits 61 and one of the slits 62 are tilted in approximately the same direction. The angle of inclination of the liquid crystal molecules can be controlled according to the magnitude of the voltage applied to the liquid crystal layer, thereby enabling display of gradations. By controlling the alignment of the liquid crystal molecules in this way, images can be displayed on the display device.

Figure 15:
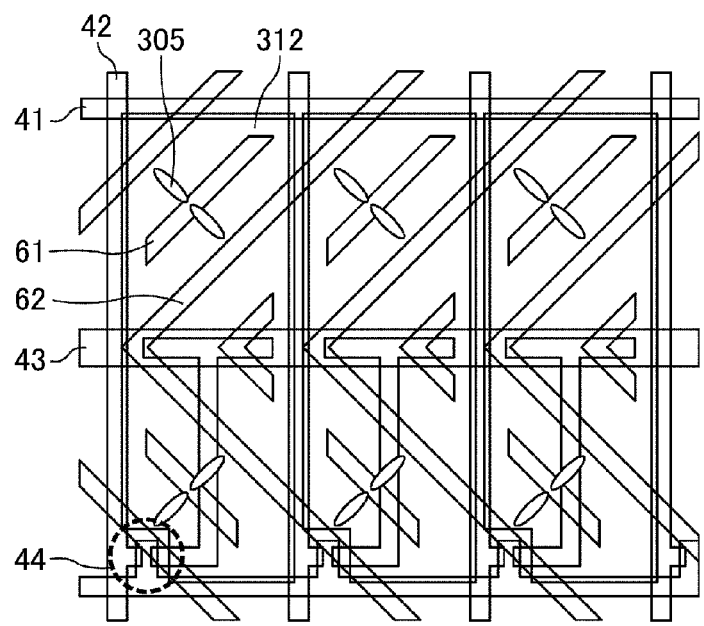
FIG. 15 is a plan view schematically illustrating a single pixel in the liquid crystal display device according to Exemplary Embodiment 3.
Figure 16:
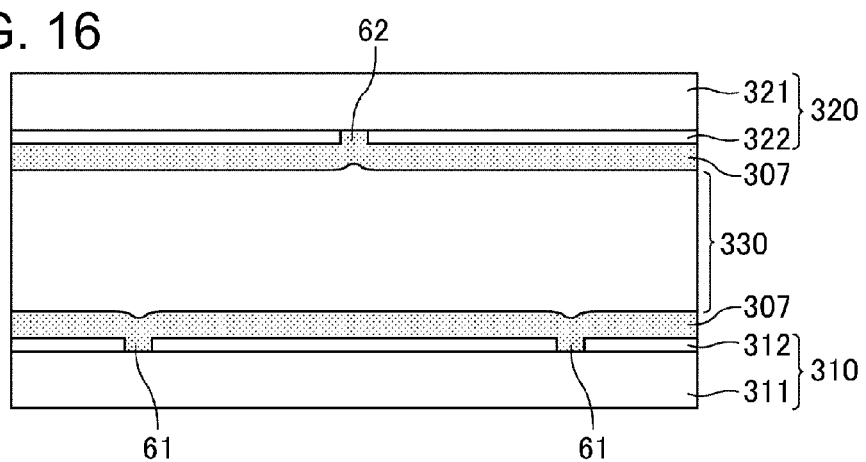
FIG. 16 is a cross-sectional view schematically illustrating the liquid crystal display device according to Exemplary Embodiment 3 after a PSA polymerization process.

FIG. 15 is a plan view schematically illustrating a single pixel in the liquid crystal display device according to Exemplary Embodiment 3 when a voltage is applied. FIG. 16 is a cross-sectional view schematically illustrating the liquid crystal display device according to Exemplary Embodiment 3 after a PSA polymerization process. As shown in FIG. 16, the first substrate (array substrate) 310 includes a glass substrate 311 on which the pixel electrode 312 is formed. The second substrate (color filter substrate) 320 includes a glass substrate 321 on which the common electrode 322 is formed. In FIG. 16, components such as wires, color filters, and alignment films are not shown.

As shown in FIG. 15, the slits 61 and 62 are line-shaped when viewed in a plan view and are positioned with a prescribed interval left between each. There may be regions in which some of these intervals are different, but it is preferable that essentially all of the slits 61 and 62 have the same prescribed intervals therebetween. This allows a more satisfactory display result to be achieved. Moreover, it is preferable that a portion of each of the slits 62 formed in the common electrode 322 is bent such that that portion of the slit forms a V-shape when viewed in a plan view. Each of the slits 61 formed in the pixel electrode 312 has a substantially rectangular shape. A plurality of slits 61 are arranged in a matrix pattern and form a single display surface. It should be noted that here, "a substantially rectangular shape" may include rectangular shapes in which one or more parts of the rectangle are either extruded or cut off, as shown in FIG. 15. This allows the liquid crystal molecules 305 near the slits 61 and 62 to be aligned in 4 different directions and in a well-balanced manner. Gate signal lines 41, source signal lines 42, auxiliary capacitance (Cs) lines 43, and TFTs 44 are configured the same as in Exemplary Embodiment 1.

Moreover, as shown in FIG. 16, polymer layers (PSA layers) 307 are formed across the entire surfaces of both substrates, including the pixel electrode 312, the common electrode 322, the parts of the pixel electrode 312 exposed by the slits 61, the parts of the common electrode 322 exposed by the slits 62, and the like. The polymer layers (PSA layers) 307 are formed such that these polymer layers are in contact with the liquid crystal layer 330.

In Exemplary Embodiment 3, the polymer layers (PSA layers) are formed using a radical-polymerizable monomer having an amide group. This makes it possible to provide a liquid crystal display device with which a high display quality can be maintained even when the device is used in high temperature or high humidity environments.

Exemplary Embodiment 4

Exemplary Embodiment 4 is an example of a CPA mode version of the liquid crystal display device according to Embodiment 1.

In Exemplary Embodiment 1, ribs were used as dielectric protrusions. However, dielectric protrusions that are generally circle-shaped when viewed in a plan view may also be used. For example, generally cone-shaped dielectric protrusions having rounded apices and which are formed on an electrode and protrude out into a liquid crystal layer may also be used. This type of generally cone-shaped dielectric protrusions that have rounded apices are also known as rivets. Moreover, this mode, in which rivets are formed to control the alignment of liquid crystal molecules, is also known as continuous pinwheel alignment (CPA) mode. This example of a CPA liquid crystal display device is configured as follows. The display device has a pair of substrates, each of which includes an electrode. Rivets are formed on the electrode of one of the substrates. The rivets are formed on the surface of the electrode that is in contact with the liquid crystal layer. Slits are formed in the electrode of the other substrate.

Figure 17:
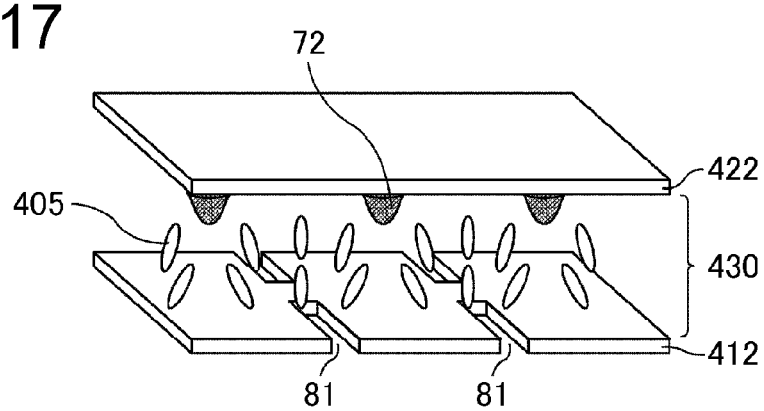
FIG. 17 is a perspective view schematically illustrating a state in which no voltage is applied to a liquid crystal display device according to Exemplary Embodiment 4.
Figure 18:
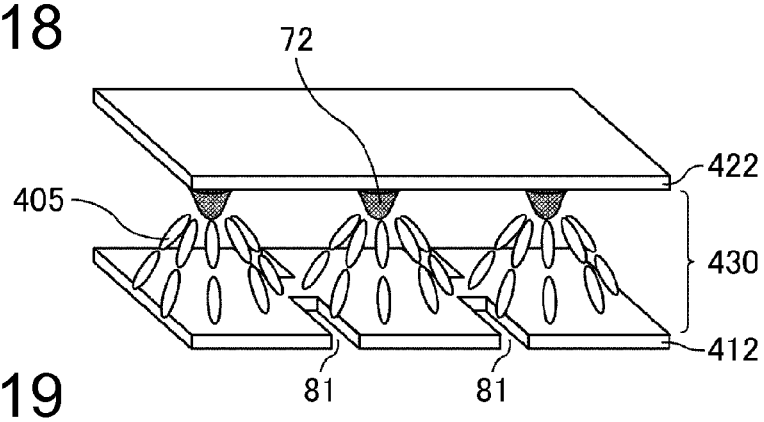
FIG. 18 is a perspective view schematically illustrating a state in which a voltage is applied to the liquid crystal display device according to Exemplary Embodiment 4.

FIGS. 17 and 18 are perspective views schematically illustrating the liquid crystal display device according to Exemplary Embodiment 4. FIG. 17 shows the liquid crystal display device when no voltage is applied, and FIG. 18 shows the liquid crystal display device when a voltage is applied. In Exemplary Embodiment 4, slits 81 are formed in a first electrode (pixel electrode) 412 of a first substrate. Moreover, rivets 72 are formed on a second electrode (common electrode) 422 of a second substrate. The rivets are formed on the surface of the second electrode that is in contact with a liquid crystal layer 430. A vertical alignment film may be formed on the surfaces of both substrates, and a liquid crystal material that exhibits negative dielectric anisotropy can be used for the liquid crystal material. A photosensitive acrylic resin can be used as the material for the rivets, for example, and the rivets can be formed using photolithography.

As shown in FIG. 17, when no voltage is applied, almost all of the liquid crystal molecules 405 (except for some of the liquid crystal molecules 405 that are directly adjacent to the rivets 72) align in the vertical direction with respect to the substrate surfaces. As shown in FIG. 18, when a voltage is applied, the liquid crystal molecules 405 align in radial patterns emanating out from the rivets 72. The angle of inclination of the liquid crystal molecules can be controlled according to the magnitude of the voltage applied to the liquid crystal layer, thereby enabling display of gradations. By controlling the alignment of the liquid crystal molecules in this way, images can be displayed on the display device.

Figure 19:
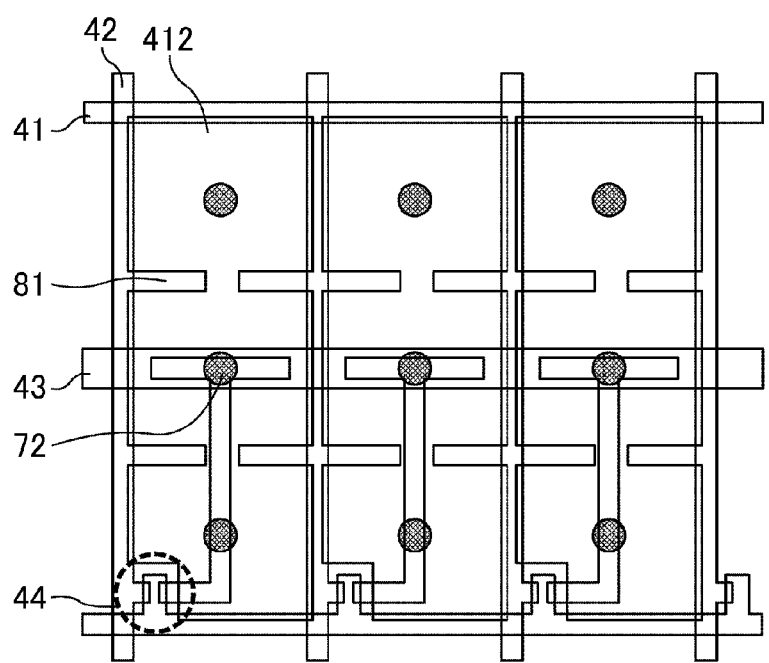
FIG. 19 is a plan view schematically illustrating a single pixel in the liquid crystal display device according to Exemplary Embodiment 4.
Figure 20:
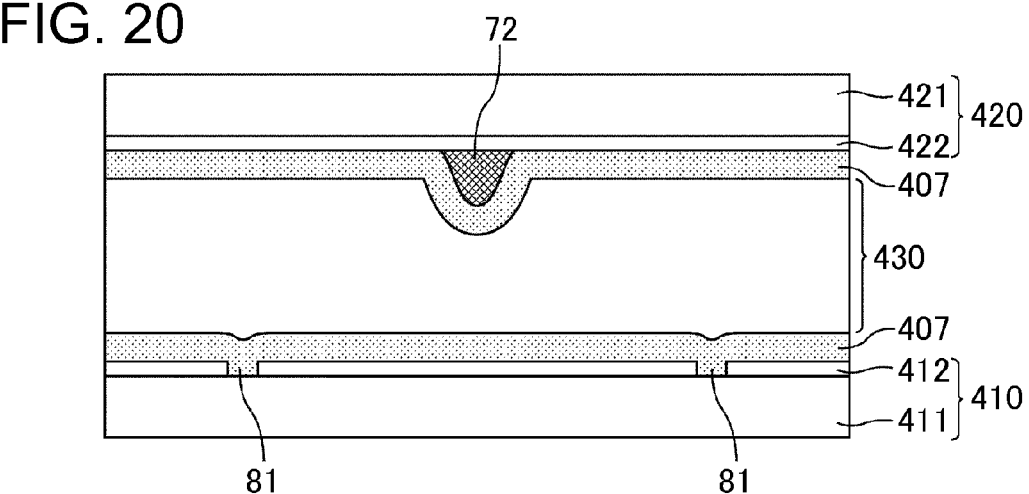
FIG. 20 is a cross-sectional view schematically illustrating the liquid crystal display device according to Exemplary Embodiment 4 after a PSA polymerization process.

FIG. 19 is a plan view schematically illustrating a single pixel in the liquid crystal display device according to Exemplary Embodiment 4. FIG. 20 is a cross-sectional view schematically illustrating the liquid crystal display device according to Exemplary Embodiment 4 after a PSA polymerization process. As shown in FIG. 20, the first substrate (array substrate) 410 includes a glass substrate 411 on which the pixel electrode 412 is formed. The second substrate (color filter substrate) 420 includes a glass substrate 421 on which the common electrode 422 is formed. In FIG. 20, components such as wires, color filters, and alignment films are not shown.

As shown in FIG. 19, each rivet 72 is generally circle-shaped when viewed in a plan view, and three rivets are provided in each sub-pixel. The slits 81 are formed in the first electrode (pixel electrode) 412 and divide each pixel electrode into three regions. Moreover, the rivets 72 are each positioned to overlap the center of one of the abovementioned three regions. It is preferable that the spacing between adjacent rivets 72 be uniform to minimize display irregularities; however, there may be regions in which the spacing is different. Gate signal lines 41, source signal lines 42, auxiliary capacitance (Cs) lines 43, and TFTs 44 are configured the same as in Exemplary Embodiment 1.

Moreover, as shown in FIG. 20, polymer layers (PSA layers) 407 are formed across the entire surfaces of both substrates, including the pixel electrode 412, the common electrode 422, the parts of the pixel electrode 412 exposed by the slits 81, the rivets 72, and the like. The polymer layers (PSA layers) 407 are formed such that these polymer layers are in contact with the liquid crystal layer 430.

In Exemplary Embodiment 4, the polymer layers (PSA layers) are formed using a radical-polymerizable monomer having an amide group. This makes it possible to provide a liquid crystal display device with which a high display quality can be maintained even when the device is used in high temperature or high humidity environments.

Exemplary Embodiment 5

Exemplary Embodiment 5 is another example of a CPA mode version of the liquid crystal display device according to Embodiment 1.

In Exemplary Embodiment 4, rivets were used in the example CPA mode liquid crystal display device. However, openings (holes) that are generally circle-shaped when viewed in a plan view may be formed in the electrode in place of using rivets. This additional example of a CPA liquid crystal display device is configured as follows. The display device has a pair of substrates, each of which includes an electrode. Openings (holes) that are generally circle-shaped when viewed in a plan view are formed in the electrode of one of the substrates. Slits are formed in the electrode of the other substrate.

Figure 21:
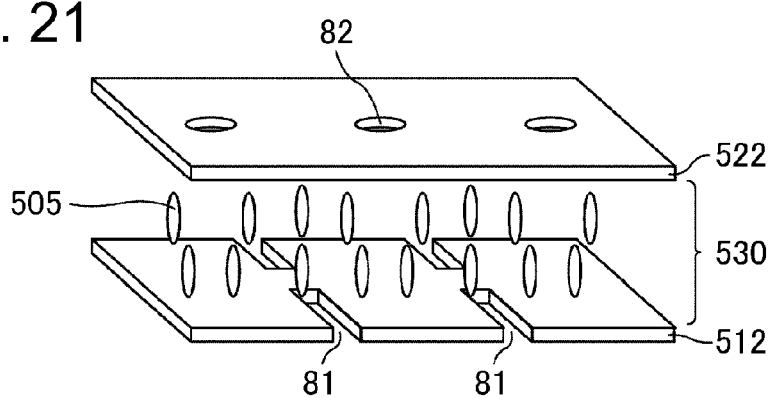
FIG. 21 is a perspective view schematically illustrating a state in which no voltage is applied to a liquid crystal display device according to Exemplary Embodiment 5.
Figure 22:
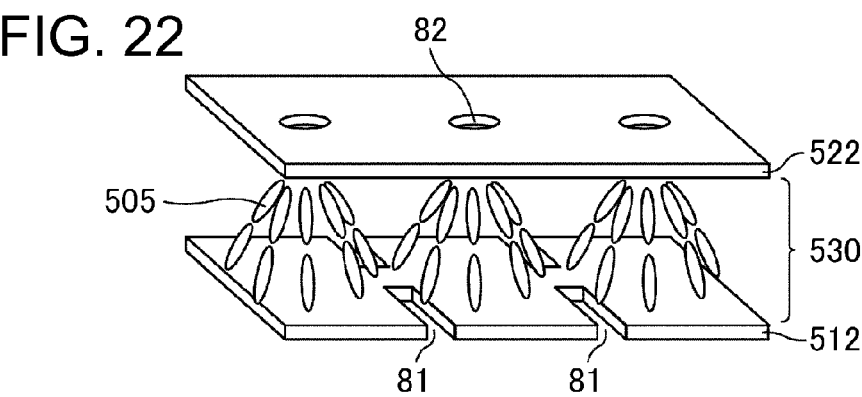
FIG. 22 is a perspective view schematically illustrating a state in which a voltage is applied to the liquid crystal display device according to Exemplary Embodiment 5.

FIGS. 21 and 22 are perspective views schematically illustrating the liquid crystal display device according to Exemplary Embodiment 5. FIG. 21 shows the liquid crystal display device when no voltage is applied, and FIG. 22 shows the liquid crystal display device when a voltage is applied. In Exemplary Embodiment 5, slits 81 are formed in a first electrode (pixel electrode) 512 of a first substrate. Moreover, holes 82 are formed in a second electrode (common electrode) 522 of a second substrate. A vertical alignment film may be formed on the surfaces of both substrates, and a liquid crystal material that exhibits negative dielectric anisotropy can be used for the liquid crystal material.

As shown in FIG. 21, when no voltage is applied, almost all of the liquid crystal molecules 505 align in the vertical direction with respect to the substrate surfaces. As shown in FIG. 22, when a voltage is applied, the liquid crystal molecules 505 align in radial patterns emanating out from the holes 82. The angle of inclination of the liquid crystal molecules can be controlled according to the magnitude of the voltage applied to the liquid crystal layer, thereby enabling display of gradations. By controlling the alignment of the liquid crystal molecules in this way, images can be displayed on the display device.

Figure 23:
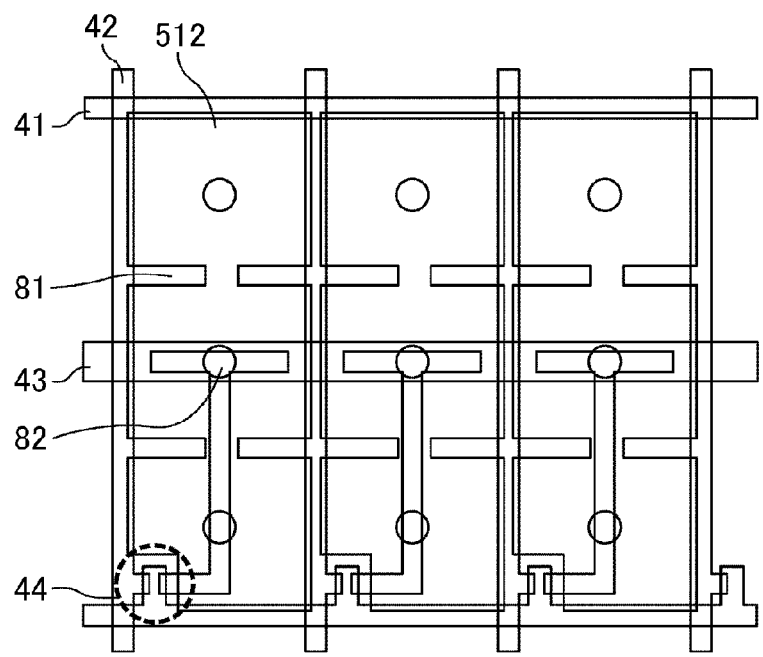
FIG. 23 is a plan view schematically illustrating a single pixel in the liquid crystal display device according to Exemplary Embodiment 5.
Figure 24:
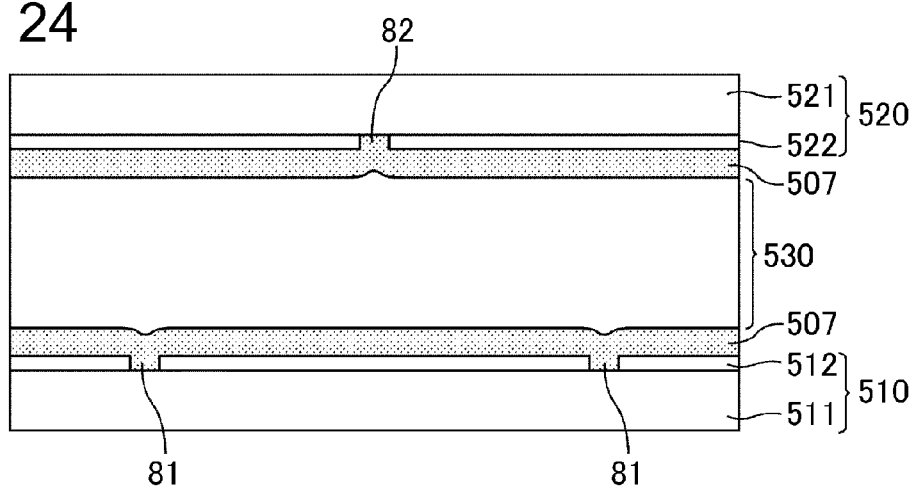
FIG. 24 is a cross-sectional view schematically illustrating the liquid crystal display device according to Exemplary Embodiment 5 after a PSA polymerization process.

FIG. 23 is a plan view schematically illustrating a single pixel in the liquid crystal display device according to Exemplary Embodiment 5. FIG. 24 is a cross-sectional view schematically illustrating the liquid crystal display device according to Exemplary Embodiment 5 after a PSA polymerization process. As shown in FIG. 24, the first substrate (array substrate) 510 includes a glass substrate 511 on which the pixel electrode 512 is formed. The second substrate (color filter substrate) 520 includes a glass substrate 521 on which the common electrode 522 is formed. In FIG. 24, components such as wires, color filters, and alignment films are not shown.

As shown in FIG. 23, each hole 82 is generally circle-shaped when viewed in a plan view, and three holes are provided in each sub-pixel. The slits 81 are formed in the first electrode (pixel electrode) 512 and divide each pixel electrode into three regions. Moreover, the holes 82 are each positioned to overlap the center of one of the abovementioned three regions. It is preferable that the spacing between adjacent holes 82 be uniform to minimize display irregularities; however, there may be regions in which the spacing is different. Gate signal lines 41, source signal lines 42, auxiliary capacitance (Cs) lines 43, and TFTs 44 are configured the same as in Exemplary Embodiment 1.

Moreover, as shown in FIG. 24, polymer layers (PSA layers) 507 are formed across the entire surfaces of both substrates, including the pixel electrode 512, the common electrode 522, the parts of the pixel electrode 512 exposed by the slits 81, the parts of the common electrode 522 exposed by the holes 82, and the like. The polymer layers (PSA layers) 507 are formed such that these polymer layers are in contact with the liquid crystal layer 530.

In Exemplary Embodiment 5, the polymer layers (PSA layers) are formed using a radical-polymerizable monomer having an amide group. This makes it possible to provide a liquid crystal display device with which a high display quality can be maintained even when the device is used in high temperature or high humidity environments.

Exemplary Embodiment 6

Exemplary Embodiment 6 is an example of a liquid crystal display device according to Embodiment 1 in which an electrode having micro-slits is used.

Figure 25:
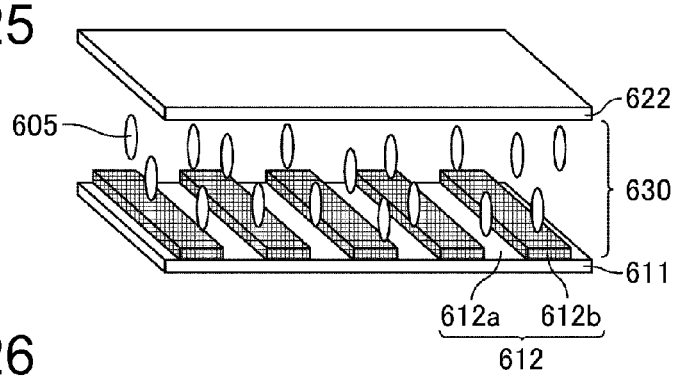
FIG. 25 is a perspective view schematically illustrating a state in which no voltage is applied to a liquid crystal display device according to Exemplary Embodiment 6.
Figure 26:
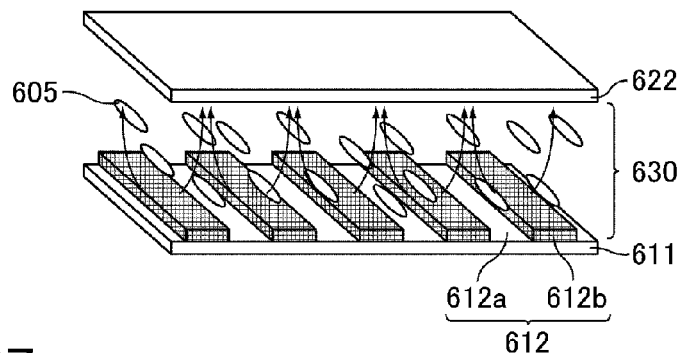
FIG. 26 is a perspective view schematically illustrating a state in which a voltage is applied to the liquid crystal display device according to Exemplary Embodiment 6.

FIGS. 25 and 26 are perspective views schematically illustrating the liquid crystal display device according to Exemplary Embodiment 6. FIG. 25 shows the liquid crystal display device when no voltage is applied, and FIG. 26 shows the liquid crystal display device when a voltage is applied. In Exemplary Embodiment 6, a first electrode (pixel electrode) 612 is formed on a first substrate and has a "fishbone" structure that includes micro-slits 612a and comb tooth portions 612b. Moreover, a flat plate-shaped second electrode (common electrode) 622 is formed on a second substrate. A vertical alignment film may be formed on the surfaces of both substrates, and a liquid crystal material that exhibits negative dielectric anisotropy can be used for the liquid crystal material.

As shown in FIG. 25, when no voltage is applied, almost all of the liquid crystal molecules 605 align in the vertical direction with respect to the substrate surfaces. As shown in FIG. 26, when a voltage is applied, an electric field that is tilted with respect to the substrate surfaces is formed in a liquid crystal layer 630 between the pixel electrode 612 and the common electrode 622. The liquid crystal molecules 605 exhibit negative dielectric anisotropy and therefore align perpendicular to the direction of the electric field. This changes the angle of inclination (tilt angle) of the liquid crystal molecules 605 relative to the substrate surfaces.

When this happens, the liquid crystal molecules attempt to tilt towards the electrodes. However, if the width of the comb tooth portions 612b and the micro-slits 612a is small, the liquid crystal molecules that are very close to the pixel electrode 612 attempt to tilt in opposite directions and interfere with one another. Eventually, these liquid crystal molecules achieve a stable alignment tilted parallel to the slits. It is preferable that the widths of the comb tooth portions 612b and the micro-slits 612a both be 1-5 μm. The angle of inclination of the liquid crystal molecules can be controlled according to the magnitude of the voltage applied to the liquid crystal layer, thereby enabling display of gradations in this case as well. By controlling the alignment of the liquid crystal molecules in this way, images can be displayed on the display device.

Figure 27:
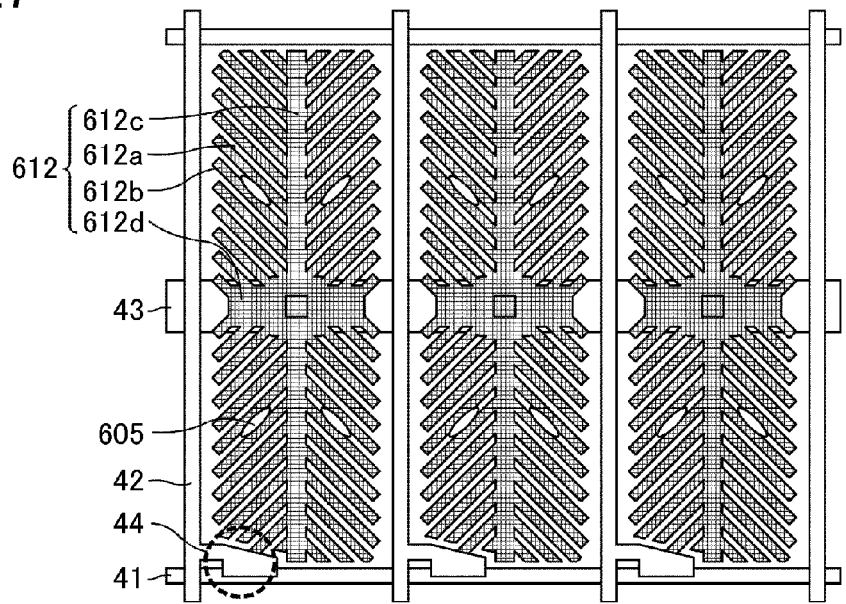
FIG. 27 is a plan view schematically illustrating a single pixel in the liquid crystal display device according to Exemplary Embodiment 6.
Figure 28:
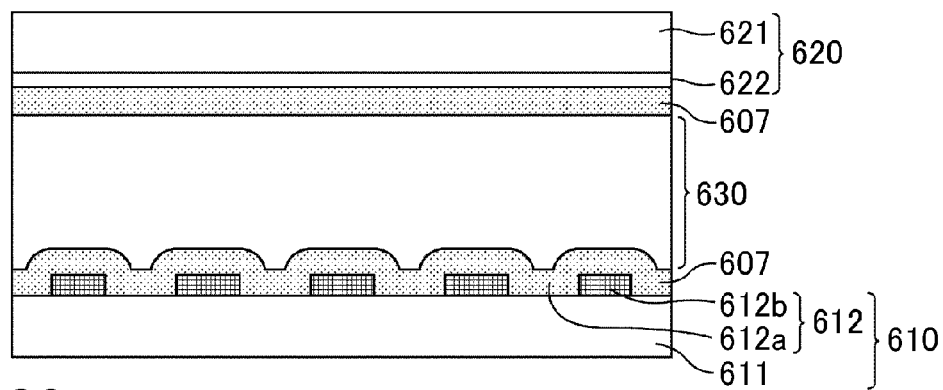
FIG. 28 is a cross-sectional view schematically illustrating the liquid crystal display device according to Exemplary Embodiment 6 after a PSA polymerization process.

FIG. 27 is a plan view schematically illustrating a single pixel in the liquid crystal display device according to Exemplary Embodiment 6 when a voltage is applied. FIG. 28 is a cross-sectional view schematically illustrating the liquid crystal display device according to Exemplary Embodiment 6 after a PSA polymerization process. As shown in FIG. 28, the first substrate (array substrate) 610 includes a glass substrate 611 on which the pixel electrode 612 is formed. The second substrate (color filter substrate) 620 includes a glass substrate 621 on which the common electrode 622 is formed. In FIG. 28, components such as wires, color filters, and alignment films are not shown.

As shown in FIG. 27, a pixel electrode 612 is provided for each region enclosed by the source signal lines 42 and the gate signal lines 41. TFTs 44 are provided near the intersections of the gate signal lines 41 and the source signal lines 42. Each pixel electrode 612 includes a connector electrode 612c, another connector electrode 612d, and a plurality of comb tooth portions 612b. Micro-slits 612a are formed between adjacent comb tooth portions 612b. The connector electrode 612c is formed parallel to the long sides of the pixel and runs along the line bisecting the pixel horizontally. The connector electrode 612d is formed parallel to the short sides of the pixel and runs along the line bisecting the pixel vertically. An auxiliary capacitance (Cs) line 43 is formed parallel to the short sides of the pixel and runs along the line bisecting the pixel vertically (in a manner similar to the connector electrode 612d). The auxiliary capacitance (Cs) line 43 overlaps the connector electrode 612d. The connector electrodes 612c and 612d divide each pixel into four identical rectangle-shaped regions. The plurality of comb tooth portions 612b extend out at angles that are multiples of 45° relative to the lengthwise direction of either the connector electrode 612c or the connector electrode 612d. More specifically, the comb tooth portions extend out at angles of 45°, 135°, 225°, and 315° relative to the lengthwise direction of either the connector electrode 612c or the connector electrode 612d. When a voltage is applied, the liquid crystal molecules 605 align parallel to the lengthwise directions of the closest slits 612a in the pixel electrode 612 and therefore align in four different directions overall. This alignment state results in more favorable viewing angle characteristics.

In Exemplary Embodiment 6, the display device may be irradiated with UV light to polymerize the radical-polymerizable monomer in a state in which an electric potential is applied to the pixel electrode 612 in order to align the liquid crystal molecules 605 parallel to the lengthwise directions of the closest slits 612a in the pixel electrode 612. Forming the polymer layers (PSA layers) when the liquid crystal molecules are aligned can give the liquid crystal molecules a pretilt angle relative to the substrate surfaces and can also fix the liquid crystal molecules in four different alignment directions. This causes some of the liquid crystal molecules near each substrate to be tilted slightly from the vertical direction relative to the substrate surfaces as well as be aligned parallel to the lengthwise directions of the slits when no voltage is applied, which in turn improves the response time of the liquid crystal molecules.

Moreover, as shown in FIG. 28, polymer layers (PSA layers) 607 are formed across the entire surfaces of both substrates, including the pixel electrode 612, the common electrode 622, the parts of the pixel electrode 612 exposed by the slits 612a, and the like. The polymer layers (PSA layers) 607 are formed such that these polymer layers are in contact with the liquid crystal layer 630.

In Exemplary Embodiment 6, the polymer layers (PSA layers) 607 are formed using a radical-polymerizable monomer having an amide group. This makes it possible to provide a liquid crystal display device with which a high display quality can be maintained even when the device is used in high temperature or high humidity environments.

Exemplary Embodiment 7

Exemplary Embodiment 7 is an example of an IPS mode version of the liquid crystal display device according to Embodiment 1.

In Exemplary Embodiments 1 to 6, display modes in which a vertical electric field is created in the liquid crystal layer to control the alignment of the liquid crystal molecules were described. However, the alignment of the liquid crystal molecules can also be controlled by creating a horizontal electric field in the liquid crystal layer. A display mode in which a horizontal electric field is created to control the alignment of liquid crystal molecules is also known as in-plane switching (IPS) mode. In this example of an IPS liquid crystal display device, a pair of comb-shaped electrodes is provided on one of the substrates.

Figure 29:
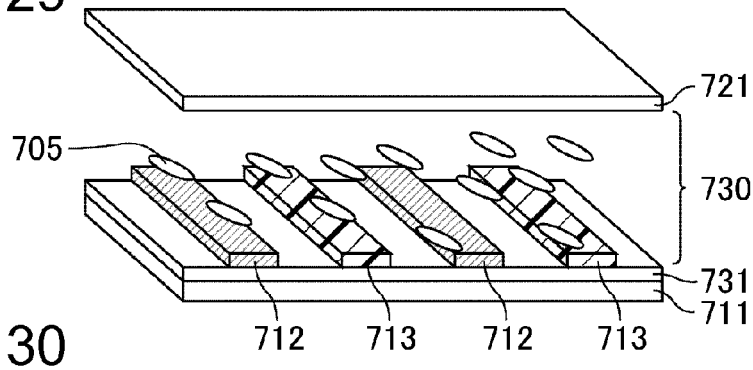
FIG. 29 is a perspective view schematically illustrating a state in which no voltage is applied to a liquid crystal display device according to Exemplary Embodiment 7.
Figure 30:
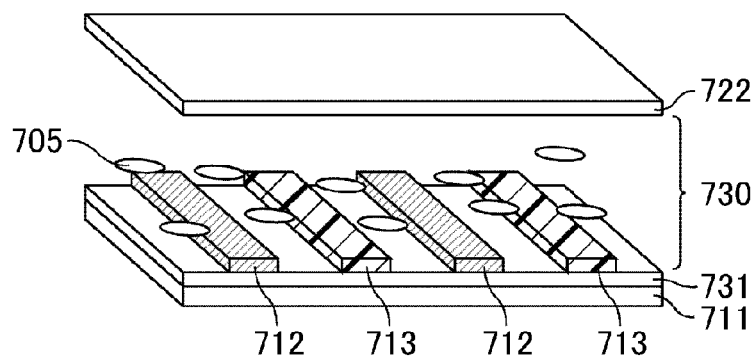
FIG. 30 is a perspective view schematically illustrating a state in which a voltage is applied to the liquid crystal display device according to Exemplary Embodiment 7.

FIGS. 29 and 30 are perspective views schematically illustrating the liquid crystal display device according to Exemplary Embodiment 7. FIG. 29 shows the liquid crystal display device when no voltage is applied, and FIG. 30 shows the liquid crystal display device when a voltage is applied. In Exemplary Embodiment 7, a comb-shaped first electrode (pixel electrode) 712 and a comb-shaped third electrode (common electrode) 713 are formed on a first substrate. A horizontal alignment film may be formed on the surfaces of both substrates, and a liquid crystal material that exhibits positive dielectric anisotropy can be used for the liquid crystal material.

As shown in FIG. 29, when no voltage is applied, the liquid crystal molecules 705 align in the horizontal direction with respect to the substrate surfaces. As shown in FIG. 30, when a voltage is applied, a horizontal electric field is created between the pixel electrode 712 and the common electrode 713, causing the liquid crystal molecules 705 to rotate to be parallel to the electric field. By controlling the alignment of the liquid crystal molecules in this way, images can be displayed on the display device.

Figure 31:
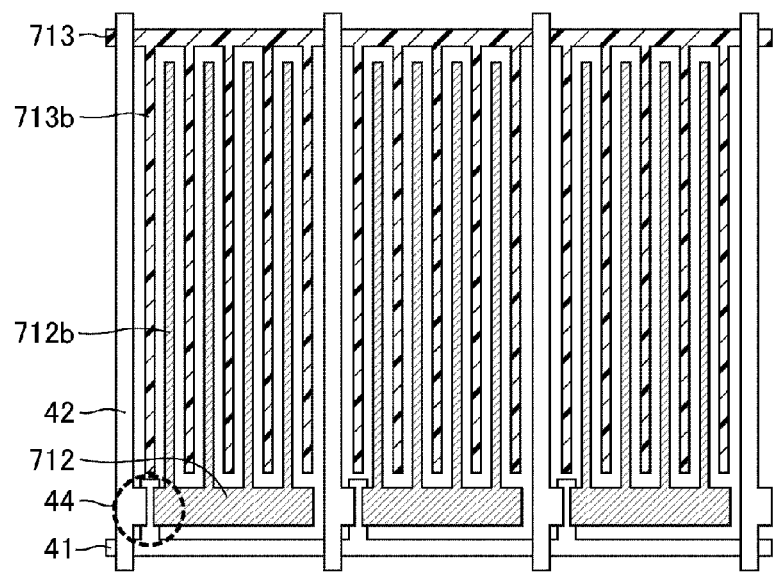
FIG. 31 is a plan view schematically illustrating a single pixel in the liquid crystal display device according to Exemplary Embodiment 7.
Figure 32:
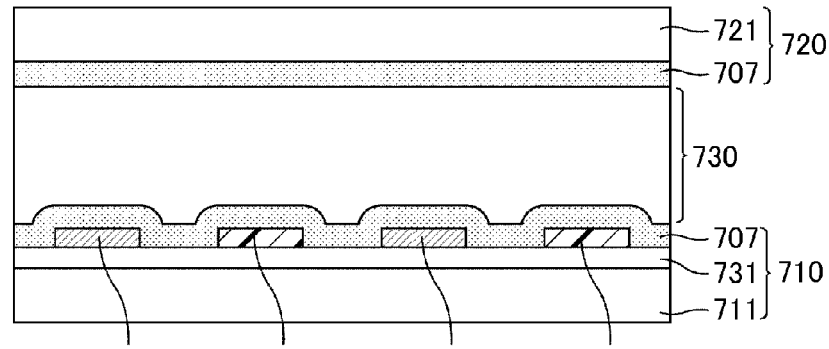
FIG. 32 is a cross-sectional view schematically illustrating the liquid crystal display device according to Exemplary Embodiment 7 after a PSA polymerization process.

FIG. 31 is a plan view schematically illustrating a single pixel in the liquid crystal display device according to Exemplary Embodiment 7. FIG. 32 is a cross-sectional view schematically illustrating the liquid crystal display device according to Exemplary Embodiment 7 after a PSA polymerization process. As shown in FIG. 32, the first substrate (array substrate) 710 includes a glass substrate 711 on which an insulator 731 is formed as well as the pixel electrode 712 and the common electrode 713, which are formed on top of the insulator 731. A second substrate (color filter substrate) 720 includes a glass substrate 721. In FIG. 32, components such as wires, color filters, and alignment films are not shown.

As shown in FIG. 31, the pixel electrode 712 and the common electrode 713 are both comb-shaped and include a plurality of comb tooth portions 712b and 713b, respectively. The pixel electrode 712 and the common electrode 713 are arranged such that the respective pluralities of comb tooth portions 712b and 713b "mesh" together and such that a prescribed interval is left therebetween. Gate signal lines 41, source signal lines 42, auxiliary capacitance (Cs) lines 43, and TFTs 44 are configured the same as in Exemplary Embodiment 1.

Moreover, as shown in FIG. 32, polymer layers (PSA layers) 707 are formed across the entire surfaces of both substrates, including the pixel electrode 712, the common electrode 713, the parts of the pixel electrode 712 exposed by the spaces between adjacent comb tooth portions 712b, the parts of the common electrode 713 exposed by the spaces between adjacent comb tooth portions 713b, and the like. The polymer layers (PSA layers) 707 are formed such that these polymer layers are in contact with the liquid crystal layer 730.

In Exemplary Embodiment 7, the polymer layers (PSA layers) are formed using a radical-polymerizable monomer having an amide group. This makes it possible to provide a liquid crystal display device with which a high display quality can be maintained even when the device is used in high temperature or high humidity environments.

Exemplary Embodiment 8

Exemplary Embodiment 8 is an example of a FFS mode version of the liquid crystal display device according to Embodiment 1.

Exemplary Embodiment 7 was an IPS liquid crystal display device in which the alignment of the liquid crystal molecules was controlled using a horizontal electric field. However, the alignment of liquid crystal molecules can also be controlled using a fringe electric field. A display mode in which a fringe electric field is created to control the alignment of liquid crystal molecules is also known as fringe field switching (FFS) mode. In this example of an FFS liquid crystal display device, a flat plate-shaped electrode and a comb-shaped electrode are provided on one of the substrates, and an insulating layer is provided between these electrodes.

Figure 33:
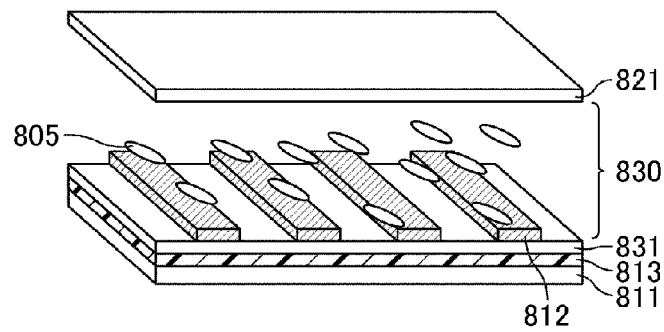
FIG. 33 is a perspective view schematically illustrating a state in which no voltage is applied to a liquid crystal display device according to Exemplary Embodiment 8.
Figure 34:
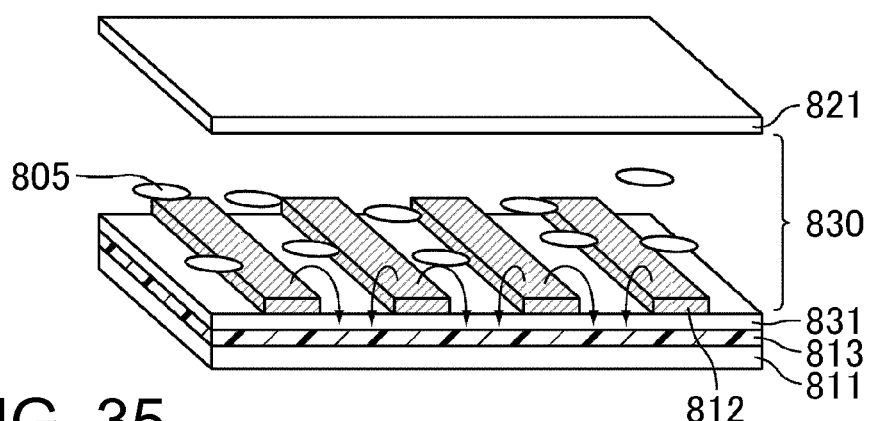
FIG. 34 is a perspective view schematically illustrating a state in which a voltage is applied to the liquid crystal display device according to Exemplary Embodiment 8.

FIGS. 33 and 34 are perspective views schematically illustrating the liquid crystal display device according to Exemplary Embodiment 8. FIG. 33 shows the liquid crystal display device when no voltage is applied, and FIG. 34 shows the liquid crystal display device when a voltage is applied. In Exemplary Embodiment 8, a comb-shaped first electrode (pixel electrode) 812 and a flat plate-shaped third electrode (common electrode) 813 are formed on a first substrate. Moreover, an insulator 831 is provided between the pixel electrode 812 and the common electrode 813. A horizontal alignment film may be formed on the surfaces of both substrates, and a liquid crystal material that exhibits positive dielectric anisotropy can be used for the liquid crystal material.

As shown in FIG. 33, when no voltage is applied, the liquid crystal molecules 805 align in the horizontal direction with respect to the substrate surfaces. As shown in FIG. 34, when a voltage is applied, a fringe electric field is created between the pixel electrode 812 and the common electrode 813, causing the liquid crystal molecules 805 to rotate to be parallel to the electric field. By controlling the alignment of the liquid crystal molecules in this way, images can be displayed on the display device.

Figure 35:
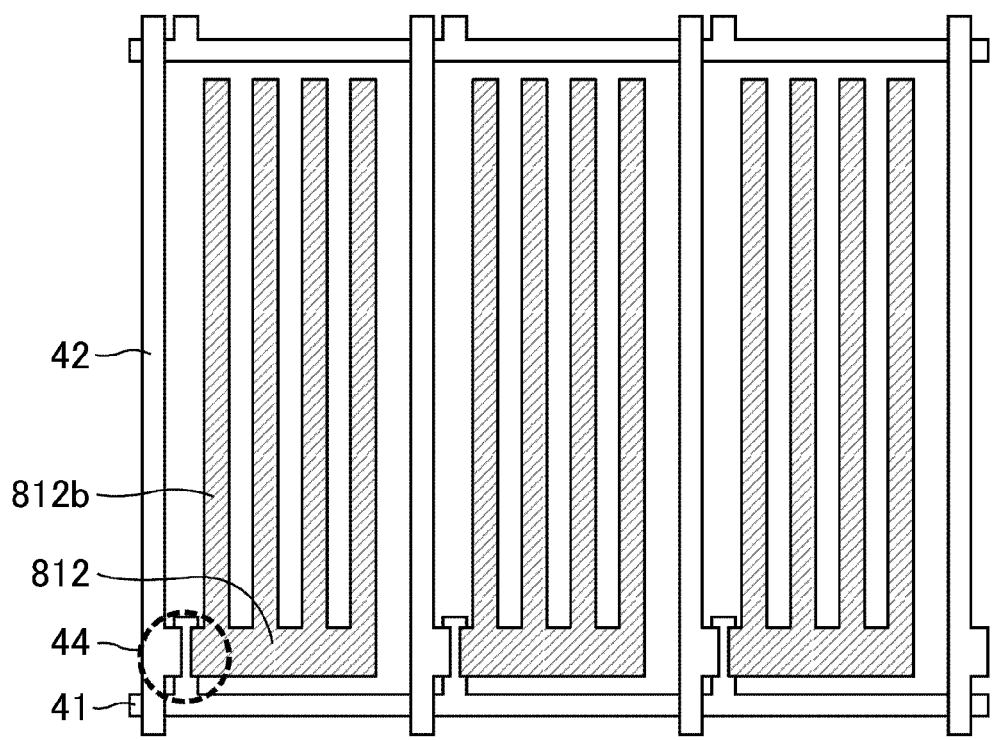
FIG. 35 is a plan view schematically illustrating a single pixel in the liquid crystal display device according to Exemplary Embodiment 8.
Figure 36:
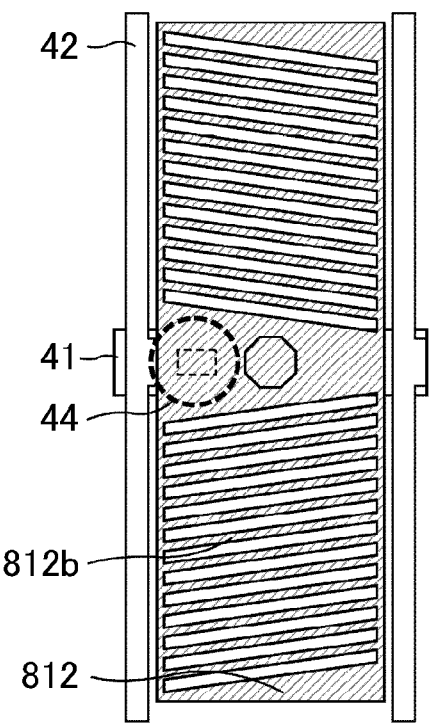
FIG. 36 shows an example of a pixel electrode of the liquid crystal display device according to Exemplary Embodiment 8.
Figure 37:
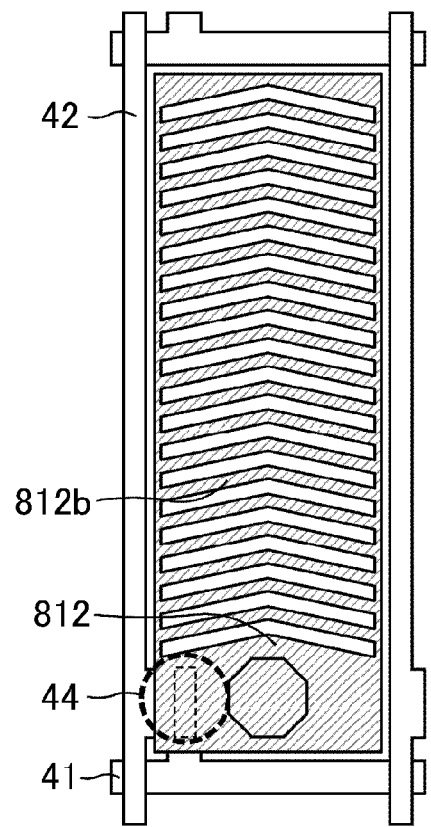
FIG. 37 shows another example of a pixel electrode of the liquid crystal display device according to Exemplary Embodiment 8.
Figure 38:
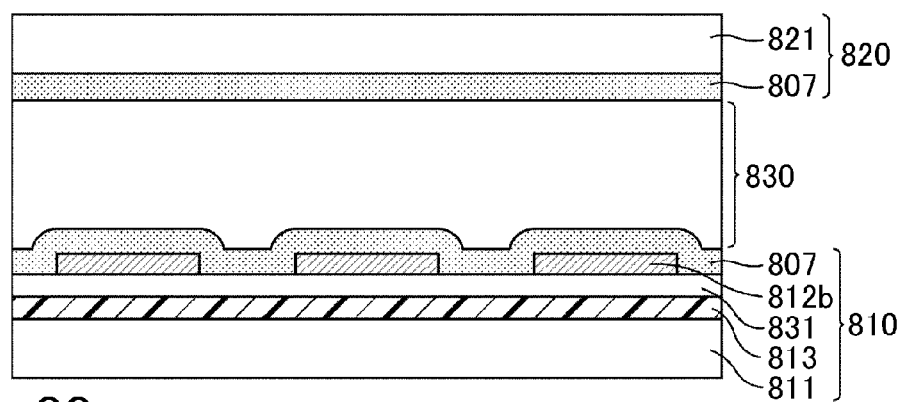
FIG. 38 is a cross-sectional view schematically illustrating the liquid crystal display device according to Exemplary Embodiment 8 after a PSA polymerization process.
Figure 39:
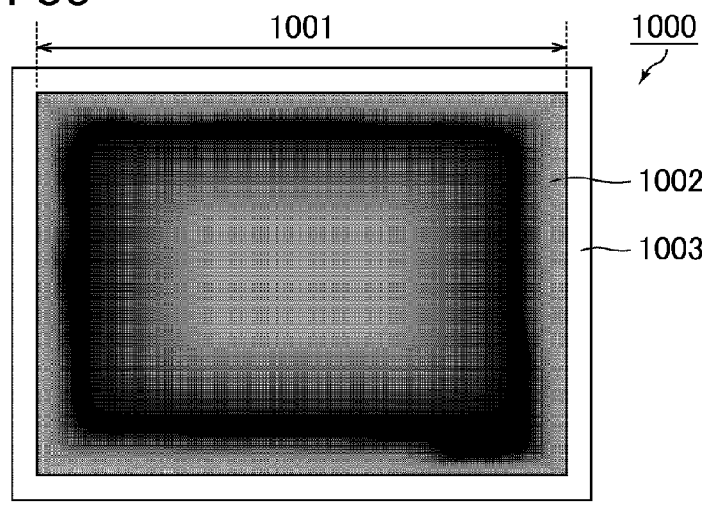
FIG. 39 is a front view of a liquid crystal display device that was used in a high temperature and high humidity environment and on which a halftone (32/255) is displayed.
Figure 40:
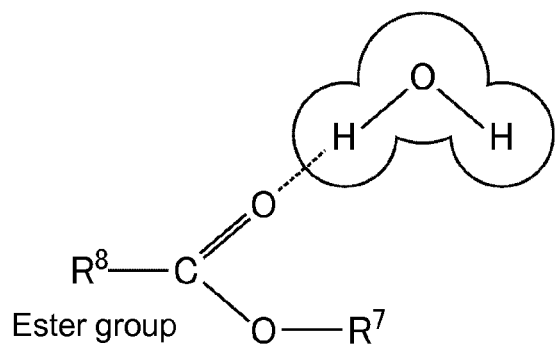
FIG. 40 illustrates the interaction of an ester group with a water molecule and the interaction of an amide group with a water molecule.
Figure 40:
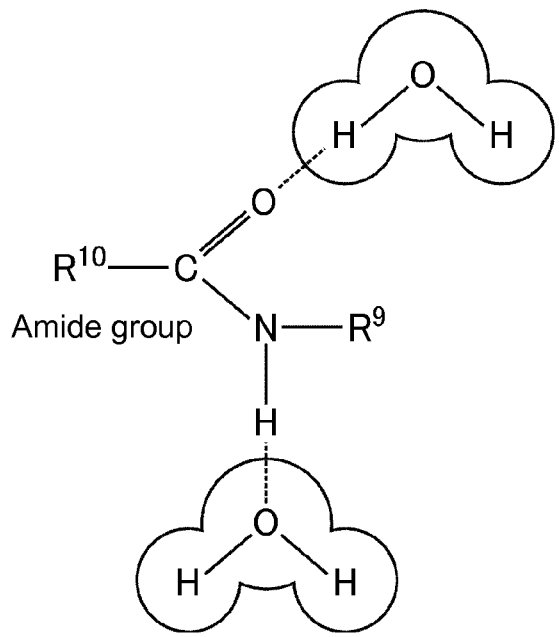

FIG. 35 is a plan view schematically illustrating a single pixel in the liquid crystal display device according to Exemplary Embodiment 8. FIGS. 36 and 37 show examples of pixel electrodes of the liquid crystal display device according to Exemplary Embodiment 8. FIG. 38 is a cross-sectional view schematically illustrating the liquid crystal display device according to Exemplary Embodiment 8 after a PSA polymerization process. As shown in FIG. 38, the first substrate (array substrate) 810 includes a glass substrate 811 on which the flat plate-shaped common electrode 813, the insulator 831, and the pixel electrode 812 are layered in order. A second substrate (color filter substrate) 820 includes a glass substrate 821. In FIG. 38, components such as wires and color filters are not shown.

As shown in FIG. 35, a pixel electrode 812 is formed in each pixel. Each pixel electrode 812 is comb-shaped and has a plurality of comb tooth portions 812b. TFTs 44 are provided near the intersections of the gate signal lines 41 and the source signal lines 42. Gate signal lines 41, source signal lines 42, auxiliary capacitance (Cs) lines 43, and TFTs 44 are configured the same as in Exemplary Embodiment 1.

In FIG. 35, the comb tooth portions 812b of the pixel electrode 812 are left open on one end. However, as shown in FIGS. 36 and 37, the comb tooth portions 812b may also be formed such that the overall comb shape is closed on both ends. In FIG. 36, a gate signal line 41 runs horizontally across the center of the pixel electrode 812, and a TFT 44 is provided at the center of the pixel electrode 812. The plurality of comb tooth portions 812b are formed at a tilted angle relative to the long sides of the pixel electrode, with a prescribed interval left open between adjacent comb tooth portions, and such that the pixel electrode 812 exhibits axial symmetry across an axis of symmetry that runs horizontally across the center of the pixel electrode 812. In this way, the comb tooth portions 812b in the upper half of the pixel electrode and the comb tooth portions 812b in the lower half of the pixel electrode are tilted at different angles. In FIG. 37, a portion of each comb tooth portion 812 is bent such that each comb tooth portion 812b forms a V-shape when viewed in a plan view. A plurality of these comb tooth portions 812b are formed approximately parallel to the short sides of the pixel electrode. The common electrode 813 has a flat plate shape. A common electrode 813 may be formed for each pixel, or a common electrode 813 that spans multiple adjacent pixels may be formed.

Moreover, as shown in FIG. 38, polymer layers (PSA layers) 807 are formed across the entire surfaces of both substrates, including the pixel electrode 812, the parts of the insulator 831 exposed by the spaces between adjacent comb tooth portions 812b, and the like. The polymer layers (PSA layers) 807 are formed such that these polymer layers are in contact with the liquid crystal layer 830.

In Exemplary Embodiment 8, the polymer layers (PSA layers) are formed using a radical-polymerizable monomer having an amide group. This makes it possible to provide a liquid crystal display device with which a high display quality can be maintained even when the device is used in high temperature or high humidity environments.

As when applied to Embodiment 1, Exemplary Embodiments 1 to 8 can be applied to Embodiment 2 to provide a liquid crystal display device with which a high display quality can be maintained even when the device is used in high temperature or high humidity environments.

(Evaluation Test)

Test cell samples A to C were constructed, and an evaluation test was performed. This evaluation test will be described below. Sample A was constructed based on Embodiment 1. Samples B and C were constructed for purposes of comparison.

The test cells were constructed using the following method. First, a pair of substrates each having a transparent electrode on one surface thereof was prepared. After cleaning the substrates, an alignment film material was applied to both substrates to create a vertical alignment film on each. ITO electrodes measuring 1 cm in width by 1 cm in height were used for the transparent electrodes. After the alignment films were formed, the substrates were pre-baked at 80° C. for 1 minute and then post-baked at 200° C. for 60 minutes. Next, a sealing material was applied to one of the substrates. Then, a liquid crystal composition containing a radical-polymerizable monomer and a liquid crystal material having negative dielectric anisotropy was dripped onto the substrate. Finally, the two substrates were sealed together. The cell thickness was set to 3.2 µm.

In Sample A, which was constructed according to Embodiment 1, the compound shown below in chemical formula (8) was used for the radical-polymerizable monomer. This compound was added to the liquid crystal composition such that the concentration of this compound in the overall liquid crystal composition was 0.2 wt %.

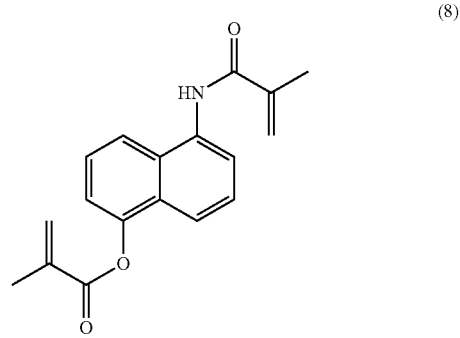 [SMILES: C=C(C)C(=O)Nc1cccc2c(OC(=O)C(=C)C)cccc12]

(8)

In Sample B, which was constructed for comparison purposes, the compound shown below in chemical formula (9) was used for the radical-polymerizable monomer. This compound was added to the liquid crystal composition such that the concentration of this compound in the overall liquid crystal composition was 0.2 wt %.

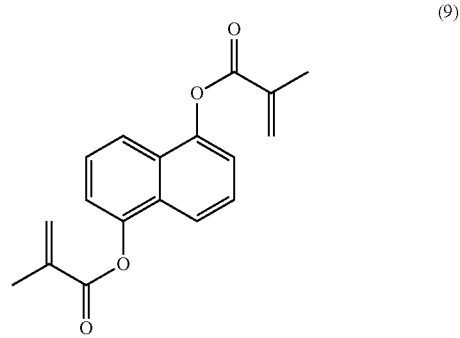 [SMILES: C=C(C)C(=O)Oc1cccc2c(OC(=O)C(=C)C)cccc12]

(9)

In Sample C, no radical-polymerizable monomer was added to the liquid crystal composition.

While a 10V voltage was applied to the transparent electrodes on both the upper and lower substrates, Samples A-C were irradiated with non-polarized UV light of intensity 2.57 mW/cm² from the normal direction relative to the substrates for a duration of 20 minutes in order to polymerize the radical-polymerizable monomer. This completed the construction of the test cells. A Toshiba Lighting & Technology Corporation FHF-32BLB Blacklight (wavelength range: 300-370 nm) was used as the source of the non-polarized UV light.

For each finished test cell, the initial voltage holding ratio (VHR) and the voltage holding ratio (VHR) after an aging test was performed were measured. For the aging test, the test cells were left in an environment with a temperature of 50° C. and 90% humidity for a duration of 1000 hours.

By measuring the voltage holding ratio (VHR) of the test cells after performing such an aging test in a high temperature, high humidity environment, the severity of any discolorations and display irregularities that might form in a real display device under similar use conditions can be evaluated. If the VHR remains high after the aging test, it can be concluded that a liquid crystal display device constructed based on the corresponding test cell would continue to exhibit a high display quality even when used in high temperature or high humidity environments.

Voltage holding ratio (VHR) was measured using a TOYO Corporation LC Material Characteristics Measurement System Model 6254. For each test cell, a pulse voltage was applied to both substrates, and the change in electric potential during the voltage dissipation period was measured. VHR was measured using a pulse voltage frequency of 30 Hz in an environment with a temperature of 70° C.

Table 1 shows the initial VHR and the VHR after the aging test for each of Samples A-C.

TABLE 1

| | Concentration of monomer relative to overall liquid crystal composition | Initial VHR (%) | VHR after aging test (%) |
|---|---|---|---|
| Sample A | Chemical formula (8): 0.2(wt %) | 99.2 ± 0.2 | 97.0 ± 0.2 |
| Sample B | Chemical formula (9): 0.2(wt %) | 99.2 ± 0.2 | 93.5 ± 0.4 |
| Sample C | No monomer added (no polymer layer formed) | 99.2 ± 0.2 | 93.8 ± 0.4 |

The initial VHR for each of Samples A-C was relatively high, at 99% or higher for each. The VHR of Sample A was approximately 97% after the aging test. In contrast, the VHR of Samples B and C had fallen as low as approximately 93% after the aging test.

One possible explanation for this result is given below. In Sample A, which was constructed according to Embodiment 1, the compound shown in chemical formula (8) was used. As a result, the polymer layers (PSA layers) that were formed had an amide group. Therefore, these polymer layers were able to form hydrogen bonds with water moisture, impurities, and the like that had infiltrated the liquid crystal layer. As a result, the VHR of Sample A did not decrease significantly even after the aging test was performed.

Meanwhile, in Sample B, which was constructed for comparison purposes, the compound shown in chemical formula (9) was used. As a result, the polymer layers (PSA layers) that were formed did not have an amide group. Therefore, these polymer layers were not able to form hydrogen bonds with water moisture, impurities, and the like that infiltrated the liquid crystal layer. As a result, the Sample B exhibited a more pronounced decrease in VHR after the aging test was performed. Moreover, Sample C also exhibited a more pronounced decrease in VHR after the aging test was performed because water moisture, impurities, and the like infiltrated the liquid crystal layer.

Working Example 1

In Working Example 1, the MVA liquid crystal display device described in Exemplary Embodiment 1 was constructed.

First, a pair of substrates that included an array substrate and a color filter substrate was prepared. On the color filter substrate, a photosensitive acrylic resin material was applied across the surface of the common electrode and patterned using photolithography to create dielectric protrusions (ribs) that were line-shaped when viewed in a plan view. Moreover, on the array substrate, a photolithography process was used to pattern pixel electrodes for each pixel and form slits in those pixel electrodes.

Next, a vertical alignment film was formed on each substrate. Then, a sealing material was applied to one of the substrates, and a liquid crystal composition containing a radical-polymerizable monomer and a liquid crystal material having negative dielectric anisotropy was dripped onto that substrate. After dripping the liquid crystal composition onto that substrate, the two substrates were sealed together. The compound shown above in chemical formula (8) was used for the radical-polymerizable monomer. This compound was added to the liquid crystal composition such that the concentration of this compound in the overall liquid crystal composition was 0.2 wt %.

Then, while a 10V voltage was applied to the common electrode and pixel electrodes, the assembly was irradiated with non-polarized UV light (of intensity 4 J/cm²) in order to polymerize the radical-polymerizable monomer. This completed the construction of the liquid crystal display device. A Toshiba Lighting & Technology Corporation FHF-32BLB Blacklight (wavelength range: 300-370 nm) was used as the source of the non-polarized UV light.

An aging test was then performed on the liquid crystal display device. The same test conditions used in the aging test in the evaluation test were used for this aging test. No discolorations or display irregularities were observed in the liquid crystal display device after the aging test was performed.

Therefore, using a monomer that had an amide group (such as the compound shown in chemical formula (8)) made it possible to provide an MVA liquid crystal display device with which a high display quality was maintained even when the device was used in a high temperature and high humidity environment. The same would be true for the MVA liquid crystal display device described in Exemplary Embodiment 2.

Working Example 2

In Working Example 2, the PVA liquid crystal display device described in Exemplary Embodiment 3 was constructed.

First, a pair of substrates that included an array substrate and a color filter substrate was prepared. On the color filter substrate, a photolithography process was used to form openings (slits) in the common electrode that were line-shaped when viewed in a plan view. Moreover, on the array substrate, a photolithography process was used to pattern pixel electrodes for each pixel and form slits in those pixel electrodes.

Next, a vertical alignment film was formed on each substrate. Then, a sealing material was applied to one of the substrates, and a liquid crystal composition containing a radical-polymerizable monomer and a liquid crystal material having negative dielectric anisotropy was dripped onto that substrate. Finally, as in Working Example 1, the substrates were sealed together. The compound shown above in chemical formula (8) was used for the radical-polymerizable monomer. This compound was added to the liquid crystal composition such that the concentration of this compound in the overall liquid crystal composition was 0.2 wt %. Then, the radical-polymerizable monomer was polymerized using the same process used in Working Example 1. This completed the construction of the liquid crystal display device.

An aging test was then performed on the liquid crystal display device. The same test conditions used in the aging test in the evaluation test were used for this aging test. No discolorations or display irregularities were observed in the liquid crystal display device after the aging test was performed.

Therefore, using a monomer that had an amide group (such as the compound shown in chemical formula (8)) to form the polymer layers (PSA layers) made it possible to provide a PVA liquid crystal display device with which a high display quality was maintained even when the device was used in a high temperature and high humidity environment.

Working Example 3

In Working Example 3, the CPA liquid crystal display device described in Exemplary Embodiment 4, in which CPA mode is achieved by using rivets, was constructed.

First, a pair of substrates that included an array substrate and a color filter substrate was prepared. On the color filter substrate, a photosensitive acrylic resin material was applied across the surface of the common electrode and patterned using photolithography to create dielectric protrusions that extended out from the electrode into the liquid crystal layer. These dielectric protrusions were generally cone-shaped, having rounded apices, and were generally circle-shaped when viewed in a plan view. Moreover, on the array substrate, a photolithography process was used to pattern pixel electrodes for each pixel and form slits in those pixel electrodes.

Next, a vertical alignment film was formed on each substrate. Then, a sealing material was applied to one of the substrates, and a liquid crystal composition containing a radical-polymerizable monomer and a liquid crystal material having negative dielectric anisotropy was dripped onto that substrate. Finally, as in Working Example 1, the substrates were sealed together. The compound shown above in chemical formula (8) was used for the radical-polymerizable monomer. This compound was added to the liquid crystal composition such that the concentration of this compound in the overall liquid crystal composition was 0.2 wt %. Then, the radical-polymerizable monomer was polymerized using the same process used in Working Example 1. This completed the construction of the liquid crystal display device.

An aging test was then performed on the liquid crystal display device. The same test conditions used in the aging test in the evaluation test were used for this aging test. No discolorations or display irregularities were observed in the liquid crystal display device after the aging test was performed.

Therefore, using a monomer that had an amide group (such as the compound shown in chemical formula (8)) to form the polymer layers (PSA layers) made it possible to provide a CPA liquid crystal display device in which CPA mode was achieved by using rivets and with which a high display quality was maintained even when the device was used in a high temperature and high humidity environment.

Working Example 4

In Working Example 4, the CPA liquid crystal display device described in Exemplary Embodiment 5, in which CPA mode is achieved by using holes, was constructed.

First, a pair of substrates that included an array substrate and a color filter substrate was prepared. On the color filter substrate, a photolithography process was used to form openings (holes) in the common electrode that were generally circle-shaped when viewed in a plan view. Moreover, on the array substrate, a photolithography process was used to pattern pixel electrodes for each pixel and form slits in those pixel electrodes.

Next, a vertical alignment film was formed on each substrate. Then, a sealing material was applied to one of the substrates, and a liquid crystal composition containing a radical-polymerizable monomer and a liquid crystal material having negative dielectric anisotropy was dripped onto that substrate. Finally, as in Working Example 1, the substrates were sealed together. The compound shown above in chemical formula (8) was used for the radical-polymerizable monomer. This compound was added to the liquid crystal composition such that the concentration of this compound in the overall liquid crystal composition was 0.2 wt %. Then, the radical-polymerizable monomer was polymerized using the same process used in Working Example 1. This completed the construction of the liquid crystal display device.

An aging test was then performed on the liquid crystal display device. The same test conditions used in the aging test in the evaluation test were used for this aging test. No discolorations or display irregularities were observed in the liquid crystal display device after the aging test was performed.

Therefore, using a monomer that had an amide group (such as the compound shown in chemical formula (8)) to form the polymer layers (PSA layers) made it possible to provide a CPA liquid crystal display device in which CPA mode was achieved by using holes and with which a high display quality was maintained even when the device was used in a high temperature and high humidity environment.

Working Example 5

In Working Example 5, the liquid crystal display device described in Exemplary Embodiment 6, in which pixel electrodes having a fishbone structure are used to achieve VA mode, was constructed.

First, a pair of substrates that included an array substrate and a color filter substrate was prepared. On the color filter substrate, a flat plate-shaped common electrode was formed. Moreover, on the array substrate, a photolithography process was used to pattern pixel electrodes for each pixel and form slits in those pixel electrodes. In the fishbone structure used for the pixel electrodes, the electrode width of the comb tooth portions was 3 µm and the slit width was 3 µm.

Next, a vertical alignment film was formed on each substrate. Then, a sealing material was applied to one of the substrates, and a liquid crystal composition containing a radical-polymerizable monomer and a liquid crystal material having negative dielectric anisotropy was dripped onto that substrate. Finally, as in Working Example 1, the substrates were sealed together. The compound shown above in chemical formula (8) was used for the radical-polymerizable monomer. This compound was added to the liquid crystal composition such that the concentration of this compound in the overall liquid crystal composition was 0.2 wt %. Then, the radical-polymerizable monomer was polymerized using the same process used in Working Example 1. This completed the construction of the liquid crystal display device.

In Working Example 5, while a voltage was applied to the pixel electrodes and the common electrode to align the liquid crystal molecules parallel to the lengthwise directions of the closest slits, the display device was irradiated with UV light to polymerize the radical-polymerizable monomer.

An aging test was then performed on the liquid crystal display device. The same test conditions used in the aging test in the evaluation test were used for this aging test. No discolorations or display irregularities were observed in the liquid crystal display device after the aging test was performed.

Therefore, using a monomer that had an amide group (such as the compound shown in chemical formula (8)) to form the polymer layers (PSA layers) made it possible to provide a liquid crystal display device in which pixel electrodes having a fishbone structure were used to achieve VA mode and with which a high display quality was maintained even when the device was used in a high temperature and high humidity environment.

Working Example 6

In Working Example 6, the IPS liquid crystal display device described in Exemplary Embodiment 7 was constructed. In this IPS liquid crystal display device, using a monomer that had an amide group (such as the compound shown in chemical formula (8)) to form the polymer layers (PSA layers) made it possible to provide a liquid crystal display device with which a high display quality was maintained even when the device was used in a high temperature and high humidity environment.

Working Example 7

In Working Example 7, the FFS liquid crystal display device described in Exemplary Embodiment 8 was constructed. In this FFS liquid crystal display device, using a monomer that had an amide group (such as the compound shown in chemical formula (8)) to form the polymer layers (PSA layers) made it possible to provide a liquid crystal display device with which a high display quality was maintained even when the device was used in a high temperature and high humidity environment.

In conclusion, the results of the evaluation test and Working Examples 1 to 7 indicated that using a monomer that has an amide group (such as the compound shown in chemical formula (8)) to form the polymer layers (PSA layers) makes it possible to provide a liquid crystal display device with which a high display quality can be maintained even when the device is used in high temperature or high humidity environments, regardless of the type of liquid crystal material, alignment films, or display mode used.

DESCRIPTION OF REFERENCE CHARACTERS 3 sealing material
4 (first) radical-polymerizable monomer
6 (second) radical-polymerizable monomer
7, 17, 107, 207, 307, 407, 507, 607, 707, 807 polymer layer (PSA layer)
8 alignment film
10, 110, 210, 310, 410, 510, 610, 710, 810 first substrate (array substrate)
20, 120, 220, 320, 420, 520, 620, 720, 820 second substrate (color filter substrate)
30, 130, 230, 330, 430, 530, 630, 730, 830 liquid crystal layer
41 gate signal line
42 source signal line
43 auxiliary capacitance (Cs) line
44 thin-film transistor (TFT)
51, 52 rib
61, 62, 81, 612a slit
72 rivet
82 hole
111, 121, 211, 221, 311, 321, 411, 421, 511, 521, 611, 621, 711, 721, 811, 821 glass substrate
112, 212, 312, 412, 512, 612, 712, 812 first electrode (pixel electrode)
122, 222, 322, 422, 522, 622 second electrode (common electrode)
105, 205, 305, 405, 505, 605, 705, 805 liquid crystal molecule
612c, 612d connector electrode
612b, 712b, 713b, 812b comb tooth portion
713, 813 third electrode (common electrode)
731, 831 insulator
1000 liquid crystal display device used in a high temperature, high humidity environment
1001 display region
1002 discolored region
1003 bezel region

What is claimed is:
1. A liquid crystal display device, comprising:
a first substrate and a second substrate;
a liquid crystal layer that contains a liquid crystal material and is sandwiched between the first substrate and the second substrate, the liquid crystal material exhibiting positive dielectric anisotropy; and
a polymer layer that controls an alignment of liquid crystal molecules and is formed on at least one of the first substrate and the second substrate,
wherein the first substrate has a first electrode,
wherein the polymer layer is formed by polymerizing one or more radical-polymerizable monomers that have been added to the liquid crystal layer,
wherein at least one of the one or more radical-polymerizable monomers is a compound represented by chemical formula (1) below,

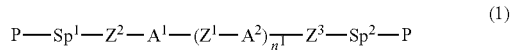

(1)

where:
P represents the same or a different radical-polymerizable group;

Sp$^1$ and Sp$^2$ may be the same or different and each represents a direct bond or a C$_1$-C$_6$ linear or branched alkylene group or alkyleneoxy group;

A$^1$ represents a divalent and alicyclic, aromatic monocyclic, or fused polycyclic hydrocarbon group;

A$^2$ represents a phenylene group or naphthalene group;

the —CH$_2$— groups in A$^1$ and A$^2$ may be replaced with —O— groups or —S— groups as long as those groups do not neighbor each other;

the —CH═ groups in A$^1$ and A$^2$ may be replaced with —N═ groups as long as those groups do not neighbor each other;

the hydrogen atoms in A$^1$ and A$^2$ may be replaced with fluorine atoms, chlorine atoms, a —CN group or C$_1$-C$_{12}$ linear or branched alkyl group, an alkoxy group, an alkylcarbonyl group, or an alkoxycarbonyl group or alkyl carbonyloxy group, and the carbon atoms in these groups may be replaced with one or more silicon atoms;

Z$^1$, Z$^2$, and Z$^3$ may be the same or different and each represents a direct bond or an —O— group, —S— group, —NH— group, —CO— group, —COO— group, —OCO— group, —O—COO— group, —OCH$_2$— group, —CH$_2$O— group, —SCH$_2$— group, —CH$_2$S— group, —N(CH$_3$)— group, —N(C$_2$H$_5$)— group, —N(C$_3$H$_7$)— group, —N(C$_4$H$_9$)— group, —NRCO— group, —CONR— group, —CF$_2$O— group, —OCF$_2$— group, —CF$_2$S— group, —SCF$_2$— group, —N(CF$_3$)— group, —CH$_2$CH$_2$— group, —CF$_2$CH$_2$— group, —CH$_2$CF$_2$— group, —CF$_2$CF$_2$— group, —CH═CH— group, —CF═CF— group, —C≡C— group, —CH═CH—COO— group, or —OCO—CH═CH— group;

n$^1$ is 0 or 1, if n$^1$ is 1, at least one of Z$^1$, Z$^2$, and Z$^3$ is an —NRCO— group or —CONR— group, and if n$^1$ is 0, at least one of Z$^2$ and Z$^3$ is an —NRCO— group or —CONR— group;

R represents a hydrogen atom or a C$_1$-C$_6$ linear alkyl group or alkenyl group, and wherein a polymer in the polymer layer contains a structural element represented by Sp$^1$-Z$^2$-A$^1$-(Z$^1$-A$^2$)$_{n1}$-Z$^3$-Sp$^2$ in a side chain, where Sp$^1$, A$^1$, A$^2$, Z$^1$, Z$^2$, Z$^3$, n$^1$, and Sp$^2$ are defined above.

2. The liquid crystal display device according to claim 1, wherein the compound represented by chemical formula (1) is a compound represented by chemical formula (2) below,

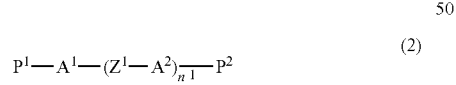

(2)

where:

A$^1$ represents a divalent and alicyclic, aromatic monocyclic, or fused polycyclic hydrocarbon group;

A$^2$ represents a phenylene group or naphthalene group;

the —CH$_2$— groups in A$^1$ and A$^2$ may be replaced with —O— groups or —S— groups as long as those groups do not neighbor each other;

the —CH═ groups in A$^1$ and A$^2$ may be replaced with —N═ groups as long as those groups do not neighbor each other;

the hydrogen atoms in A$^1$ and A$^2$ may be replaced with fluorine atoms, chlorine atoms, a —CN group or C$_1$-C$_{12}$ linear or branched alkyl group, an alkoxy group, an alkylcarbonyl group, or an alkoxycarbonyl group or alkyl carbonyloxy group, and the carbon atoms in these groups may be replaced with one or more silicon atoms;

Z$^1$ represents a direct bond or an —O— group, —CO— group, —COO— group, —OCO— group, —NRCO— group, or —CONR— group;

R represents a hydrogen atom or a C$_1$-C$_6$ linear alkyl group or alkenyl group;

P$^1$ and P$^2$ may be the same or different and each represents a radical-polymerizable group, and at least one of P$^1$ and P$^2$ is an acryloyl amino group or methacryloyl amino group; and n$^1$ is 0 or 1.

3. The liquid crystal display device according to claim 1, wherein the compound represented by chemical formula (1) is a compound represented by any one of chemical formulas (3-1) to (3-18) below,

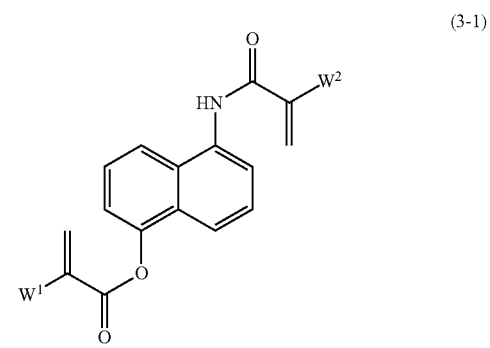

(3-1)

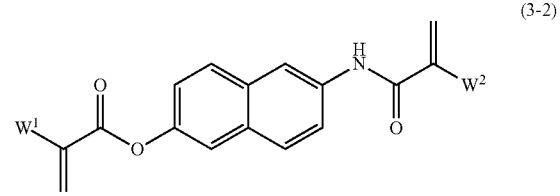

(3-2)

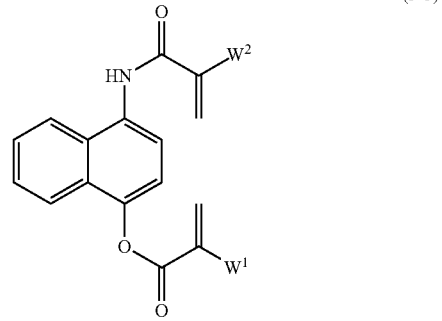

(3-3)

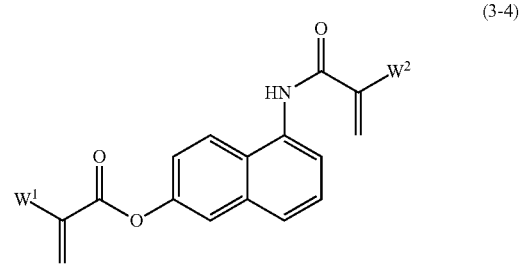

(3-4)

-continued
(3-5)
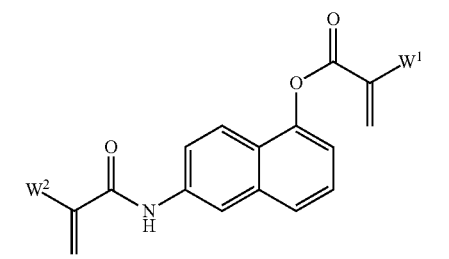
(3-6)
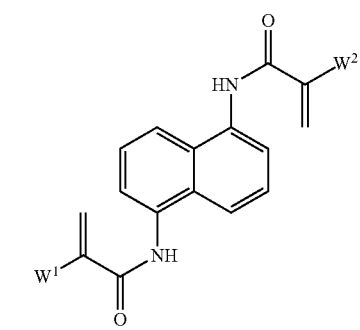
(3-7)
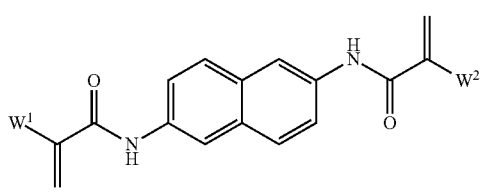
(3-8)
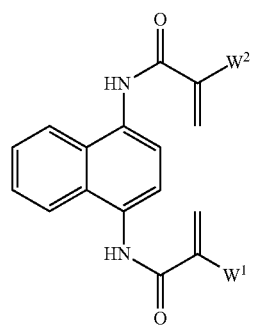
(3-9)
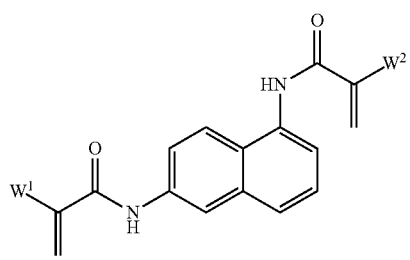
(3-10)
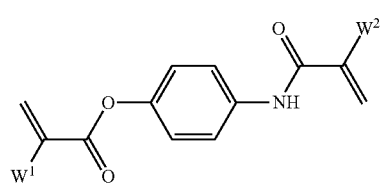
-continued
(3-11)
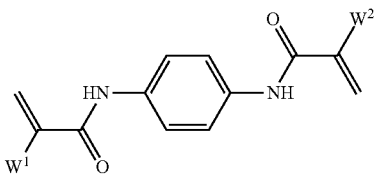
(3-12)
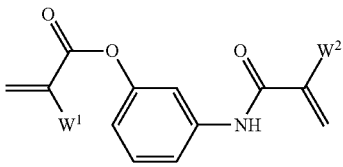
(3-13)
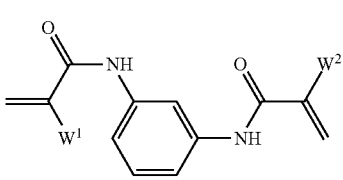
(3-14)
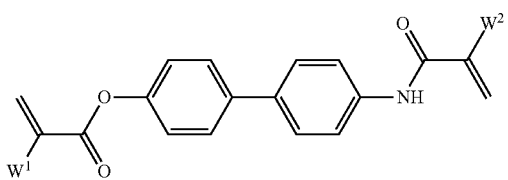
(3-15)
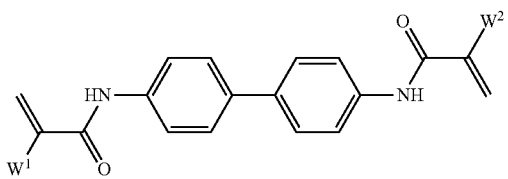
(3-16)
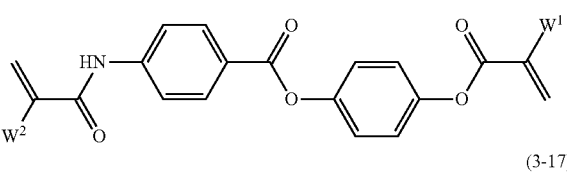
(3-17)
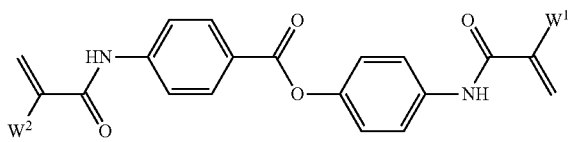
(3-18)
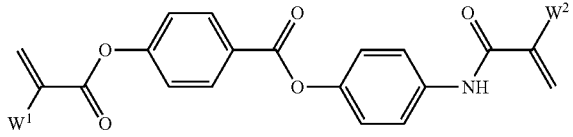
where $W^1$ and $W^2$ may be the same or different and each represents an —H group or a —CH$_3$ group.
4. The liquid crystal display device according to claim 1, further comprising:
at least another of the radical-polymerizable monomers, said at least another monomer having a structure that generates radicals due to a hydrogen abstraction reaction that occurs when the monomer is irradiated with light or having a structure that generates radicals due to a self-cleavage reaction that occurs when the monomer is irradiated with light.

5. The liquid crystal display device according to claim 4, wherein the monomer having a structure that generates radicals due to a hydrogen abstraction reaction that occurs when the monomer is irradiated with light is a compound represented by chemical formula (4) below,

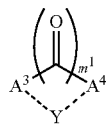

(4)

where:
$A^3$ represents an aromatic ring;
$A^4$ represents the same aromatic ring as $A^3$, a different aromatic ring, or a $C_1$-$C_{12}$ linear or branched alkyl group or alkenyl group;
at least one of $A^3$ and $A^4$ represents an -$Sp^3$-P group;
at least one of the aromatic rings represented by $A^3$ and $A^4$ is a benzene ring or a biphenyl ring;
the hydrogen atoms in $A^3$ and $A^4$ may be replaced by an -$Sp^3$-P group, halogen atoms, a —CN group, —$NO_2$ group, —NCO group, —NCS group, —OCN group, —SCN group, —$SF_5$ group, or a $C_1$-$C_{12}$ alkyl, alkenyl, or aralkyl group, and the alkyl group or alkenyl group may be linear or branched;
two neighboring hydrogen atoms in $A^3$ and $A^4$ may be replaced by a $C_1$-$C_{12}$ linear or branched alkylene group or alkenylene group such that $A^3$ and $A^4$ have a ring structure;
the hydrogen atoms in the alkyl group, alkenyl group, alkylene group, alkenylene group, or aralkyl group of $A^3$ and $A^4$ may be replaced by an -$Sp^3$-P group;
the —$CH_2$— groups in the alkyl group, alkenyl group, alkylene group, alkenylene group, or aralkyl group of $A^3$ and $A^4$ may be replaced by an —O— group, —S— group, —NH— group, —CO— group, —COO— group, —OCO— group, —O—COO— group, —$OCH_2$— group, —$CH_2O$— group, —$SCH_2$— group, —$CH_2S$— group, —$N(CH_3)$— group, —$N(C_2H_5)$— group, —$N(C_3H_7)$— group, —$N(C_4H_9)$— group, —$CF_2O$— group, —$OCF_2$— group, —$CF_2S$— group, —$SCF_2$— group, —$N(CF_3)$— group, —$CH_2CH_2$— group, —$CF_2CH_2$— group, —$CH_2CF_2$— group, —$CF_2CF_2$— group, —CH=CH— group, —CF=CF— group, —C≡C— group, —CH=CH—COO— group, or —OCO—CH=CH— group as long as there are no oxygen atoms, sulfur atoms, or nitrogen atoms adjacent to one another;
P represents a radical-polymerizable group;
$Sp^3$ represents a direct bond or a $C_1$-$C_6$ linear, branched, or ring-shaped alkylene group or alkyleneoxy group;
$m^1$ is 1 or 2;
the dotted line connecting $A^3$ and Y and the dotted line connecting $A^4$ and Y indicate that there may be a bond between $A^3$ and $A^4$ via Y; and
Y represents a direct bond or a —$CH_2$— group, —$CH_2CH_2$— group, —CH=CH— group, —O— group, —S— group, —NH— group, —$N(CH_3)$— group, —$N(C_2H_5)$— group, —$N(C_3H_7)$— group, —$N(C_4H_9)$— group, —$OCH_2$— group, —$CH_2O$— group, —$SCH_2$— group, or —$CH_2S$— group.

6. The liquid crystal display device according to claim 4, wherein the monomer having a structure that generates radicals due to a self-cleavage reaction that occurs when the monomer is irradiated with light is a compound represented by chemical formula (5) below,

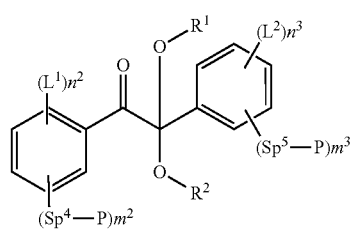

(5)

where:
$R^1$ represents an -$Sp^6$-P group or a $C_1$-$C_4$ linear or branched alkyl group or alkenyl group;
$R^2$ represents an -$Sp^7$-P group or a $C_1$-$C_4$ linear or branched alkyl group or alkenyl group;
P represents the same or a different radical-polymerizable group, and there are a total of two or more P groups;
$Sp^4$ represents a direct bond or a $C_1$-$C_6$ linear, branched, or ring-shaped alkylene group, alkyleneoxy group, or alkylene carbonyloxy group, and when $m^2$ is 2 or higher, the $Sp^4$ groups may be the same or different;
$Sp^5$ represents a direct bond or a $C_1$-$C_6$ linear, branched, or ring-shaped alkylene group, alkyleneoxy group, or alkylene carbonyloxy group, and when $m^3$ is 2 or higher, the $Sp^5$ groups may be the same or different;
$Sp^6$ represents a $C_1$-$C_6$ linear, branched, or ring-shaped alkylene group, alkyleneoxy group, or alkylene carbonyloxy group;
Sp' represents a $C_1$-$C_6$ linear, branched, or ring-shaped alkylene group, alkyleneoxy group, or alkylene carbonyloxy group;
$L^1$ represents an —F group, —OH group, a $C_1$-$C_{12}$ linear or branched alkyl group or alkenyl group, or an aralkyl group, and when $n^2$ is 2 or higher, the $L^1$ groups may be the same or different;
in two $L^1$ groups, when two adjacent carbon atoms in the aromatic rings are bonded to one another, those carbon atoms may be bonded to one another such that the overall group has a ring-shaped structure, and in this case, the two $L^1$ groups may be the same or different and each is a $C_1$-$C_{12}$ linear or branched alkylene group or alkenylene group;
$L^2$ represents an —F group, —OH group, a $C_1$-$C_{12}$ linear or branched alkyl group or alkenyl group, or an aralkyl group, and when $n^3$ is 2 or higher, the $L^2$ groups may be the same or different;
in two $L^2$ groups, when two adjacent carbon atoms in the aromatic rings are bonded to one another, those carbon atoms may be bonded to one another such that the overall group has a ring-shaped structure, and in this case, the two $L^2$ groups may be the same or different and each is a $C_1$-$C_{12}$ linear or branched alkylene group or alkenylene group;
one or more hydrogen atoms in the alkyl group, alkenyl group, alkylene group, alkenylene group, or aralkyl group of $L^1$ and $L^2$ may be replaced by an —F group or an —OH group;

the —CH²— groups in the alkyl group, alkenyl group, alkylene group, alkenylene group, or aralkyl group of $L^1$ and $L^2$ may each be replaced by an —O— group, —S— group, —NH— group, —CO— group, —COO— group, —OCO— group, —O—COO— group, —OCH$_2$— group, —CH$_2$O— group, —SCH$_2$— group, —CH$_2$S— group, —N(CH$_3$)— group, —N(C$_2$H$_5$)— group, —N(C$_3$H$_7$)— group, —N(C$_4$H$_9$)— group, —CF$_2$O— group, —OCF$_2$— group, —CF$_2$S— group, —SCF$_2$— group, —N(CF$_3$)— group, —CH$_2$CH$_2$— group, —CF$_2$CH$_2$— group, —CH$_2$CF$_2$— group, —CF$_2$CF$_2$— group, —CH=CH— group, —CF=CF— group, —C≡C— group, —CH=CH—COO— group, —OCO—CH=CH— group, -Sp$^4$-P group, or -Sp$^5$-P group as long as there are no oxygen atoms, sulfur atoms, or nitrogen atoms adjacent to one another;

$m^2$ is an integer from 1 to 3;
$m^3$ is an integer from 0 to 3;
$n^2$ is an integer from 0 to 4;
$n^3$ is an integer from 0 to 4;
the sum of $m^2$ and $n^2$ is an integer from 1 to 5;
the sum of $m^3$ and $n^3$ is an integer from 0 to 5; and
the sum of $m^2$ and $m^3$ is an integer from 1 to 6.

7. The liquid crystal display device according to claim 1, further comprising:
a second electrode provided on the second substrate.

8. The liquid crystal display device according to claim 7, wherein dielectric protrusions are provided on at least one of the first electrode and the second electrode on the surface of the electrode that is in contact with the liquid crystal layer.

9. The liquid crystal display device according to claim 7, wherein openings are formed in at least one of the first electrode and the second electrode.

10. The liquid crystal display device according to claim 8, wherein the dielectric protrusions are line-shaped or circle-shaped when viewed in a plan view.

11. The liquid crystal display device according to claim 9, wherein the openings are line-shaped or circle-shaped when viewed in a plan view.

12. The liquid crystal display device according to claim 1, further comprising:
a third electrode provided on the first substrate.

13. The liquid crystal display device according to claim 12, wherein the first electrode and third electrode are both comb-shaped electrodes.

14. The liquid crystal display device according to claim 12,
wherein the first electrode has a flat plate shape,
wherein the third electrode is comb-shaped, and
wherein an insulating layer is provided between the first electrode and the third electrode.

15. The display of claim 1, wherein in formula (1), $A^1$ is a benzene-1,2-diyl group; a benzene-1,3-diyl group; a benzene-1,4-diyl group; a pyridine-2,3-diyl group; a pyridine-2,4-triyl group; a pyridine-2,5-diyl group; a pyridine-2,6-diyl group; a naphthalene-1,2-diyl group; a naphthalene-1,4-diyl group; a naphthalene-1,5-diyl group; a naphthalene-1,8-diyl group; a naphthalene-2,3-diyl group; a naphthalene-2,6-diyl group; a naphthalene-2,7-diyl group; a cyclohexane-1,2-diyl group; a cyclohexane-1,3-diyl group; a cyclohexane-1,4-diyl group; a decahydronaphthalene-1,2-diyl group; a decahydronaphthalene-1,4-diyl group; a decahydronaphthalene-1,5-diyl group; a decahydronaphthalene-1,8-diyl group; a decahydronaphthalene-2,3-diyl group; a decahydronaphthalene-2,6-diyl group; an indane-1,1-diyl group; an indane-1,3-diyl group; an indane-1,5-diyl group; an indane-1,6-diyl group; a phenanthrene-1,6-diyl group; a phenanthrene-1,8-diyl group; a phenanthrene-1,9-diyl group; a phenanthrene-2,7-diyl group; a phenanthrene-2,9-diyl group; a phenanthrene-3,6-diyl group; a phenanthrene-3,9-diyl group; a phenanthrene-9,10-diyl group; a anthracene-1,4-diyl group; an anthracene-1,5-diyl group; an anthracene-1,9-diyl group; an anthracene-2,3-diyl group; an anthracene-2,6-diyl group; an anthracene-2,9-diyl group; or an anthracene-9,10-diyl group.

16. The display of claim 1, wherein in formula (1), $A^2$ is a benzene-1,2-diyl group; a benzene-1,3-diyl group; a benzene-1,4-diyl group; a naphthalene-1,2-diyl group; a naphthalene-1,4-diyl group; a naphthalene-1,5-diyl group; a naphthalene-1,8-diyl group; a naphthalene-2,3-diyl group; a naphthalene-2,6-diyl group; or a naphthalene-2,7-diyl group.

17. The display of claim 2, wherein in formula (2), $A^1$ is a benzene-1,2-diyl group; a benzene-1,3-diyl group; a benzene-1,4-diyl group; a pyridine-2,3-diyl group; a pyridine-2,4-triyl group; a pyridine-2,5-diyl group; a pyridine-2,6-diyl group; a naphthalene-1,2-diyl group; a naphthalene-1,4-diyl group; a naphthalene-1,5-diyl group; a naphthalene-1,8-diyl group; a naphthalene-2,3-diyl group; a naphthalene-2,6-diyl group; a naphthalene-2,7-diyl group; a cyclohexane-1,2-diyl group; a cyclohexane-1,3-diyl group; a cyclohexane-1,4-diyl group; a decahydronaphthalene-1,2-diyl group; a decahydronaphthalene-1,4-diyl group; a decahydronaphthalene-1,5-diyl group; a decahydronaphthalene-1,8-diyl group; a decahydronaphthalene-2,3-diyl group; a decahydronaphthalene-2,6-diyl group; an indane-1,1-diyl group; an indane-1,3-diyl group; an indane-1,5-diyl group; an indane-1,6-diyl group; a phenanthrene-1,6-diyl group; a phenanthrene-1,8-diyl group; a phenanthrene-1,9-diyl group; a phenanthrene-2,7-diyl group; a phenanthrene-2,9-diyl group; a phenanthrene-3,6-diyl group; a phenanthrene-3,9-diyl group; a phenanthrene-9,10-diyl group; a anthracene-1,4-diyl group; an anthracene-1,5-diyl group; an anthracene-1,9-diyl group; an anthracene-2,3-diyl group; an anthracene-2,6-diyl group; an anthracene-2,9-diyl group; or an anthracene-9,10-diyl group.

18. The display of claim 2, wherein in formula (2), $A^2$ is a benzene-1,2-diyl group; a benzene-1,3-diyl group; a benzene-1,4-diyl group; a naphthalene-1,2-diyl group; a naphthalene-1,4-diyl group; a naphthalene-1,5-diyl group; a naphthalene-1,8-diyl group; a naphthalene-2,3-diyl group; a naphthalene-2,6-diyl group; or a naphthalene-2,7-diyl group.

* * * * *